(12) United States Patent
Yamauchi et al.

(10) Patent No.: US 8,174,194 B2
(45) Date of Patent: May 8, 2012

(54) DISCHARGE LAMP, LIGHT SOURCE DEVICE AND PROJECTOR

(75) Inventors: Kentaro Yamauchi, Matsumoto (JP); Shunpei Ogaya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 331 days.

(21) Appl. No.: 12/222,174

(22) Filed: Aug. 4, 2008

(65) Prior Publication Data
US 2009/0040478 A1    Feb. 12, 2009

(30) Foreign Application Priority Data

Aug. 6, 2007 (JP) ................. 2007-204583
Jun. 26, 2008 (JP) ................. 2008-167437

(51) Int. Cl.
*H01J 11/00* (2012.01)
*H01J 17/00* (2006.01)
*H01J 17/04* (2012.01)

(52) U.S. Cl. ........................ 313/631; 313/567

(58) Field of Classification Search .................. None
See application file for complete search history.

(56) References Cited

U.S. PATENT DOCUMENTS

| | | | |
|---|---|---|---|
| 7,057,345 B2 | 6/2006 | Kikuchi et al. | |
| 7,211,956 B2 | 5/2007 | Tukamoto et al. | |
| 7,377,670 B2 | 5/2008 | Takezawa | |
| 7,397,189 B2 | 7/2008 | Kobayashi et al. | |
| 7,649,319 B2 * | 1/2010 | Matsumoto et al. | 313/631 |
| 2004/0075390 A1 * | 4/2004 | Kikuchi et al. | 313/631 |
| 2005/0190554 A9 * | 9/2005 | Takezawa | 362/267 |
| 2006/0055329 A1 | 3/2006 | Yamashita et al. | |
| 2006/0273722 A1 | 12/2006 | Matsumoto et al. | |

FOREIGN PATENT DOCUMENTS

| | | |
|---|---|---|
| JP | A-7-122241 | 5/1995 |
| JP | A-8-69777 | 3/1996 |
| JP | A 2004-055416 | 2/2004 |
| JP | A-2004-288394 | 10/2004 |
| JP | A-2004-362861 | 12/2004 |
| JP | A-2005-283706 | 10/2005 |
| JP | A-2006-79986 | 3/2006 |
| JP | A-2006-269165 | 10/2006 |
| JP | A-2006-339068 | 12/2006 |
| WO | WO 2004/086453 A1 | 10/2004 |

* cited by examiner

Primary Examiner — Natalie Walford
(74) Attorney, Agent, or Firm — Oliff & Berridge, PLC

(57) ABSTRACT

A discharge lamp includes: an emitting portion in which a pair of electrodes are disposed, an electric discharge being generated between the pair of electrodes so as to emit light; at least either one electrode of the pair of the electrodes including: a small-diameter portion; and a large-diameter portion provided on an end of the small-diameter portion closer to the other electrode, the large-diameter portion having a larger diameter than the small-diameter portion; and the large-diameter portion including a projecting part, the projecting part projecting outward from the large-diameter portion.

14 Claims, 10 Drawing Sheets

DISCHARGE LAMP, LIGHT SOURCE DEVICE AND PROJECTOR

The entire disclosure of Japanese Patent Applications No. 2007-204583, filed Aug. 6, 2007, and No. 2008-167437 filed Jun. 26, 2008, is expressly incorporated by reference herein.

BACKGROUND

1. Technical Field

The present invention relates to a discharge lamp for generating light by electric discharge between an internally-provided pair of electrodes, and to a light source device and a projector respectively including the discharge lamp.

2. Related Art

Discharge lamps, each of which includes: an emitting portion in which a pair of electrodes are disposed and discharge space for encapsulating an emitting material such as mercury or rare gas is provided; and a pair of sealing portions respectively extending in a direction away from each other with the emitting portion interposed therebetween, the pair of sealing portions internally provided with electrode-connecting wires connected to the electrodes, have been known. In such a discharge lamp, when a voltage is applied on the electrodes, an electric discharge is generated at a predetermined portion of the electrodes, so that heat generated by the electric discharge is transferred to front ends of the electrodes (i.e., ends close to each other). When a temperature of the front ends of the electrodes reaches a predetermined temperature region, an arc discharge is started between the front ends, thereby reacting the emitting material between the electrodes to emit light.

According to a known arrangement of such an electrode, an electrode includes a shaft (core stick) and a coil wound around the shaft. Since an electric field is concentrated on step portions of the coil of the electrode, an electric discharge tends to be generated at the step portions of the coil. While the electrode can be considerably worn and deformed when the temperature of the electrode becomes excessively high, the coil contributes to an increase in heat capacity, thereby keeping the electrode at a suitable temperature. In addition, by winding the coil around the shaft, a diameter of the electrode can be easily adjusted to correspond to wattage of the discharge lamp.

However, when such a step portion is located at a position closer to the sealing portions, an arc generated by the electric discharge at the step portion may collide on an inner wall of the tube made of a material such as quartz glass. In such an instance, the emitting portion may become white-turbid due to damages on the inner wall, or tungsten, i.e., a material for forming the electrode, may adhere to the emitting portion due to defects in a halogen cycle to cause a tanning thereon, by which a lifetime of the discharge lamp may be shortened. In such a discharge lamp, the inner wall of the emitting portion of the discharge lamp is typically formed in a shape of substantially sphere around the center of a line connecting the electrodes. Thus, particularly when a distance between the inner wall of the emitting portion and a starting point of an electric discharge is short, problems as described above become notable.

According to a known arrangement of a discharge lamp, in view of such problems, a starting point of an electric discharge is arranged to be placed adjacent to a front end of the electrode (for instance, see Document 1: JP-A-2006-79986).

According to the arrangement of the discharge lamp disclosed in the Document 1, a winding portion formed by winding a wire of tungsten in a coiled manner and a curved portion formed by heat-treating and fusing the most rear portion of the winding portion are provided in the vicinity of the front end of the electrode. In the curved portion, a step between the coil and the shaft is reduced. With such an arrangement, the starting point of an electric discharge is placed on a space present in the winding portion, thereby preventing an electric discharge from being started at a rear end of the electrode at which a distance between the inner wall of the discharge lamp and the electrode is short.

When a discharge lamp is lighted for a long time, tungsten having been freed from the electrode forms sharp crystals on a portion of the shaft adjacent to the rear end of the electrode, so that an electric discharge may be started from the crystals, thereby hindering the starting point of an electric discharge from being specified.

More specifically, when an arc collides on the inner wall of the discharge lamp, silicon oxide for forming the tube of the discharge lamp is vaporized to be separated into silicon and oxygen, and the separation of silicon oxide causes tungsten forming the electrode to be vaporized. Then, among the vaporized tungsten, tungsten halide having been placed out of a halogen cycle is convectively delivered to the vicinity of the shaft (core stick), by which tungsten atoms are considered to be accumulated on the shaft. As described above, the starting point of an electric discharge in the electrode tends to be placed on step portions that project radially outward from the electrode. Thus, when tungsten is accumulated and crystallized to form a sharp shape, the starting point of an electric discharge when lighting of the lamp is initiated can be placed on the portion on which tungsten is accumulated. Hence, even if the starting point of an electric discharge is attempted to be specified on a portion of the coil by providing a curved portion in the vicinity of the rear end of the coil as in the arrangement of the discharge lamp disclosed in the Document 1, the starting point of an electric discharge may not be specified due to a long-time lighting of the discharge lamp.

SUMMARY

An advantage of some aspects of the invention is in providing a discharge lamp, a light source device and a projector capable of placing a starting point of an electric discharge at a desirable position.

A discharge lamp according to an aspect of the invention includes an emitting portion in which a pair of electrodes are disposed, an electric discharge being generated between the pair of electrodes so as to emit light. At least either one electrode of the pair of the electrodes includes: a small-diameter portion; and a large-diameter portion provided on an end of the small-diameter portion closer to the other electrode, the large-diameter portion having a larger diameter than the small-diameter portion. The large-diameter portion includes a projecting part that projects outward from the large-diameter portion.

According to the aspect of the invention, the large-diameter portion of the electrode includes the projecting part that projects outward from the diameter of the large-diameter portion. With this arrangement, an electric field is concentrated on the projecting part when a voltage is applied on the electrode, so that the projecting part can serve as a starting point of an electric discharge. Thus, even when the electrode is worn due to long-time lighting of the discharge lamp and a material for forming the electrode is accumulated and crystallized on the small-diameter portion, the starting point of an electric discharge can be placed on the projecting part. In addition, with the projecting part being provided on the large-diameter portion, heat generated by the electric discharge at the projecting part can be conducted to the large-diameter portion, thereby rapidly raising a temperature of the large-diameter portion. Accordingly, not only the starting point of an electric discharge can be placed on the projecting part, but also an arc discharge between the electrodes can be rapidly started where the electrodes are adjacent to each other, thereby contributing to a longer lifetime of the electrodes and the discharge lamp.

In the aspect of the invention, the large-diameter portion preferably includes: a coil wound along an axial direction of the small-diameter portion; and a body located closer to the other electrode than the coil.

When the body is formed integrally with the small-diameter portion while having a larger diameter than the small-diameter portion, the coil may be provided on the small-diameter portion at a position apart from the other electrode, or alternatively may be wound around the small-diameter portion from a position spaced apart by a predetermined space from a front end of the small-diameter portion. In the above case, a portion extending from the front end of the small-diameter portion to the coil is equivalent to the body while a region encompassing the body and the coil is equivalent to the large-diameter portion. Further alternatively, the body may be of the same diameter as the small-diameter portion. It is only required that at least either one of the body and the coil have a diameter larger than the small-diameter portion.

According to the aspect of the invention, since the large-diameter portion includes the body and the coil, the diameter of the large-diameter portion can be easily adjusted by, for instance, setting a dimension of the body or the winding number of the coil. In addition to the above, heat capacity of the large-diameter portion can also be increased. Thus, even when the body is heated, wearing and deformation of the electrodes can be further prevented, thereby contributing to a longer lifetime of the electrodes.

In the aspect of the invention, the projecting part is preferably a circular component that is substantially circular-shaped and mounted on the large-diameter portion.

According to the aspect of the invention, since the projecting part is the circular component that projects outward from the large-diameter portion, the projecting part can cover a larger area in an outer periphery of the large-diameter portion as compared with an arrangement in which the projecting part is provided by a protrusion. In addition, in an arrangement where a trigger wire for enhancing triggering characteristics is provided in the discharge lamp, an electric discharge tends to be started in the large-diameter portion at a predetermined position that faces the trigger wire. In contrast, according to the aspect of the invention, since the projecting part is provided by the circular component, projecting portions can be more easily set to face the trigger wire. Accordingly, the starting point of an electric discharge can be reliably placed on the projecting part.

In the aspect of the invention, the circular component preferably includes at least one protrusion that projects radially outward from the circular component, the at least one protrusion being narrowed as extending to its front end in a direction in which the at least one protrusion projects.

An electric field is more concentrated on a protrusion-like portion having a thin tip ends, so that the starting point of an electric discharge tends to be placed thereon when the lighting of the discharge lamp is initiated. According to the aspect of the invention, since the circular component includes at least one protrusion, the starting point of an electric discharge can be placed on the protrusion.

In the aspect of the invention, the circular component preferably includes an opening into which the large-diameter portion is inserted.

According to the aspect of the invention, by inserting the large-diameter portion into the opening provided to the circular component, the circular component can be reliably positioned on the large-diameter portion.

In the aspect of the invention, the circular component preferably includes a cutout connected to the opening, the cutout being formed along an axial direction of the circular component.

According to the aspect of the invention, by fitting the large-diameter portion in the opening through the cutout of the circular component, the circular component can be mounted on the large-diameter portion. In other words, not during the manufacturing of the large-diameter portion, the circular component can also be post-mounted on the large-diameter portion. Thus, mounting of the circular component on the large-diameter portion can be facilitated.

In addition, since an electric field tends to be concentrated on an end periphery of the cutout when the lighting of the discharge lamp is initiated, the starting point of an electric discharge when the lighting is initiated can be placed on the end periphery.

In the aspect of the invention, the circular component is preferably mounted on the large-diameter portion at a position between substantially the center of the large-diameter portion and an end of the large-diameter portion closer to the other electrode.

Since a distance between the circular component and the inner wall of the emitting portion is short in an arrangement where the emitting portion is substantially spherical around the center of a line connecting the electrodes and the circular component is provided on the large-diameter portion at a position away from the other electrode, an arc generated by an electric discharge at the circular component may collide on the inner wall of the emitting portion and damage the inner wall. In addition, in such an arrangement where the circular component is provided at the above-described position, heat generated by the electric discharge at the circular component is less conductive to the front end of the electrode, so that the electric discharge is continued at the circular component for a longer time, thereby increasing probability with which an arc generated by the electric discharge collides on the emitting portion.

In contrast, according to the aspect of the invention, since the circular component is provided on the large-diameter portion between substantially the center thereof and the end thereof adjacent to the other electrode, a long distance can be retained between the circular component and the inner wall of the emitting portion. Thus, an arc generated by an electric discharge at the circular component is prevented from colliding on the inner wall of the emitting portion.

In the aspect of the invention, the projecting part is preferably a protrusion provided on the large-diameter portion, the protrusion being narrowed as extending in a direction away from the large-diameter portion.

As described above, when the lighting of the discharge lamp is initiated, an electric discharge tends to be started at a protrusion-like portion that is narrowed as extending to its front end. Accordingly, by arranging the projecting part to be the protrusion that is narrowed as extending to the front end in the direction away from the large-diameter portion, the starting point of an electric discharge can be reliably placed on the projecting part.

In the aspect of the invention, the projecting part is preferably provided on the body.

According to the aspect of the invention, with the arrangement where the projecting part, at which an electric discharge is started, is provided on the body, heat generated by the electric discharge at the projecting part can rapidly raise the temperature of the body. In addition, since a long distance can be retained between the projecting part and the inner wall of the emitting portion in an arrangement where the emitting portion is substantially spherical around the center of the line connecting the electrodes, an arc generated by the electric discharge at the projecting part is prevented from colliding on the inner wall of the emitting portion. Accordingly, an arc discharge at the body of the electrode can be rapidly started, thereby enhancing triggering characteristics of the discharge lamp and additionally preventing generation of white turbidness and tanning of the emitting portion.

Further, in an arrangement where a separately-provided member is mounted on the body to form the projecting part, it is easier to mount the member on the body than the coil. Accordingly, manufacturing processes of the electrodes can be simplified.

Alternatively, according to the aspect of the invention, the projecting part is preferably provided on the coil.

The coil is less worn and less deformed than the body even when the discharge lamp is kept lighted for a long time. Thus, according to the aspect of the present invention, wearing and deformation of the projecting part can be prevented by providing the projecting part on the coil, so that an advantage that the starting point of an electric discharge can be placed on the above-described projecting part can be obtained for a long time.

In the aspect of the invention, the projecting part preferably projects in a direction away from the other electrode.

When the projecting part projects in a direction close to the other electrode, an electric discharge is continued at the projecting part even after the front end of the large-diameter portion is sufficiently heated, and a position of an electric discharge is not shifted to the body, such that the emitting center of the discharge lamp is not positioned at the center of the line connecting the electrodes.

In contrast, according to the aspect of the invention, with the arrangement where the projecting part projects in the direction away from the other electrode, an electric discharge is effected at the projecting part only when the lighting of the discharge lamp is initiated. On the other hand, when heat generated by the electric discharge is conducted to the front end of the electrode and the front end of the large-diameter portion is sufficiently heated, the electric discharge can be effected at the front end of the large-diameter portion. Accordingly, the emitting center of the discharge lamp can be reliably positioned between the electrodes.

The invention is particularly effectively applied to an optical device such as a projector, on which optical components are disposed based on the emitting center of the discharge lamp.

In the aspect of the invention, the projecting part is preferably made of a first material prepared by adding a trigger assisting material to a second material, the large-diameter portion being made of the second material.

An example of the second material for forming the large-diameter portion is tungsten. The trigger assisting material is preferably a metal that tends to eject electrons when applied with a voltage, an example of which is thorium.

According to the aspect of the invention, since the trigger assisting material is added to the projecting part, an electric discharge is promoted to be effected at the projecting part. Accordingly, the starting point of an electric discharge can be more reliably placed on the projecting part.

In the aspect of the invention, the discharge lamp preferably further includes a trigger wire disposed along an outer surface of the discharge lamp, the trigger wire assisting the discharge lamp in igniting lighting when a voltage is applied, and the projecting part preferably projects toward the trigger wire.

As described above, an electric discharge generated when the lighting of the discharge lamp is initiated is more likely to be started at a portion that faces the trigger wire in the large-diameter portion. Thus, according to the aspect of the invention, with the arrangement where the projecting part projects toward the trigger wire, the starting point of an electric discharge when the lighting of the electric tube is initiated can be easily placed on the projecting part. Accordingly, the starting point of an electric discharge can be more reliably placed on the projecting part.

In the aspect of the invention, the discharge lamp preferably further includes a sub-mirror that covers a portion of the emitting portion adjacent to a first electrode of the pair of electrodes, the sub-mirror reflecting light incident thereon toward a second electrode of the pair of electrodes, and the projecting part is preferably provided only on the first electrode of the pair of electrodes, the first electrode being adjacent to the sub-mirror.

When the lighting of the discharge lamp is stopped, an emitting material such as mercury encapsulated in the emitting portion adheres to an electrode that is the more easily cooled of the two electrodes. At this time, when the sub-mirror is provided so as to cover the portion of the emitting portion adjacent to the first electrode, the sub-mirror keeps warm a portion of the emitting portion in the vicinity of the sub-mirror. Accordingly, the first electrode provided adjacent to the sub-mirror is less easily cooled while the second electrode provided away from the sub-mirror is easily cooled. Hence, the emitting material tends to adhere to the second electrode, i.e., the electrode that is the more easily cooled, so that a projecting part provided to the second electrode is buried in the emitting material. If the projecting part is buried as described above, an advantage that the starting point of an electric discharge when the lighting of the discharge lamp is initiated can be placed on the projecting part may not be obtained. In contrast, the emitting material tends not to adhere to the first electrode adjacent to the sub-mirror, and a projecting pan provided on the first electrode is exposed. Thus, the starting point of an electric discharge when the lighting of the discharge lamp is initiated can be effectively placed on the projecting part. Accordingly, by providing the projecting part only on the first electrode at which the starting point of an electric discharge is effectively placed, simplification of manufacturing processes of the discharge lamp and reduction in manufacturing cost of the discharge lamp can be realized as compared with an arrangement where the projecting part is provided to both of the electrodes.

A light source device according to another aspect of the invention includes: the above-described discharge lamp; and a reflecting mirror that reflects light irradiated from the discharge lamp in one direction so as to transfer the light as light beams.

According to the aspect of the invention, the same advantages as those of the above-described discharge lamp may be obtained. In addition, since a longer lifetime of the discharge lamp can be realized, the discharge lamp does not need to be frequently replaced.

A projector according to a further aspect of the invention includes: the above-described light source device; an optical modulator that modulates light beams irradiated from the light source device in accordance with image information; and a projection optical device that projects the modulated light beams.

According to the aspect of the invention, the same advantages as those of the above-described light source device may be obtained. In addition, since a longer lifetime of the discharge lamp can be realized, it is possible to prevent sudden reduction in emitting luminance of the discharge lamp entailed by lighting of the discharge lamp for a long time, thereby preventing reduction in luminance of projected images.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

1. First Exemplary Embodiment

A first exemplary embodiment of the invention will be described below with reference to the attached drawings.
Arrangement of Projector 1

Figure 1:
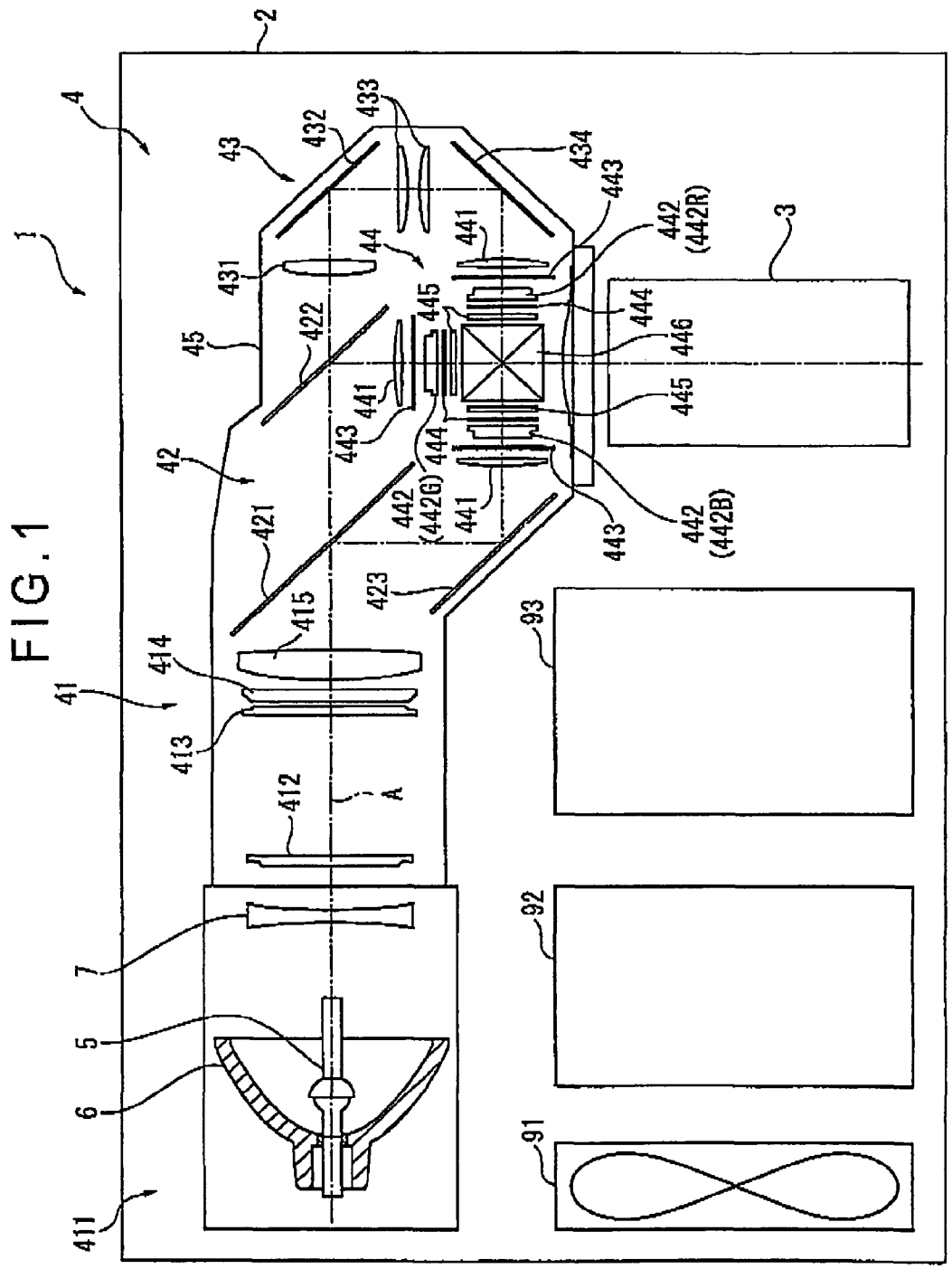
FIG. 1 schematically shows an arrangement of a projector according to a first exemplary embodiment of the invention.

FIG. 1 schematically shows an arrangement of a projector 1 according to this exemplary embodiment.

The projector 1 modulates a light beam irradiated by an internally-provided light source device 411 based on image information so as to generate image light, and projects an image according to the image light onto a projection surface such as a screen (not shown) in an enlarged manner. As shown in FIG. 1, the projector 1 includes an exterior casing 2, a projection lens 3, an optical unit 4 and the like.

Additionally to the above, the projector 1 exemplarily further includes: a cooling unit 91 that includes, for instance, a cooling fan for cooling the inside of the projector 1; a power source unit 92 for feeding power to each component provided within the projector 1; and a control unit 93 for controlling the entirety of the projector. The above units are provided within the exterior casing 2.

Among the above units, the power source unit 92 converts a commercially-available alternating current fed from the outside of the projector 1 into a direct current, raises or lowers the voltage in accordance with each component provided within the projector 1, and subsequently feeds each component with the power.
Arrangements of Exterior Casing 2 and Projection Lens 3

The entirety of the exterior casing 2 has a shape of substantially rectangular parallelepiped for accommodating the projection lens, the optical unit 4 and the like therein. While the exterior casing 2 is exemplarily formed of a synthetic resin according to the exemplary embodiment, a material for the exterior casing 2 is not limited thereto. The exterior casing 2 may be formed of another material such as metal.

The projection lens 3 is a projection optical device for focusing the image light generated by the optical unit 4 onto the projection surface such as a screen (not shown) and projecting thereto an image according to the image light in an enlarged manner. The projection lens 3 is a group lens of which tubular lens barrel accommodates plural lenses.
Arrangement of Optical Unit 4

The optical unit 4 is a unit controlled by the control unit 93 to optically process the light beam irradiated by the light source so as to generate the image light corresponding to the image information. As shown in FIG. 1, the optical unit 4, which extends both along a rear face of the exterior casing 2 and along a lateral face of the exterior casing 2, is substantially L-shaped in top view.

The optical unit 4 includes an illumination optical device 41, a color-separating optical device 42, a relay optical device 43, an electro-optic device 44 and an optical component casing 45 for internally accommodating the optical components 41 to 44 and supporting the projection lens 3 at a predetermined position so as to fix the projection lens 3 thereto.

The illumination optical device 41 is for substantially uniformly illuminating an image formation area of a later-described liquid crystal display panel 442 that is included in the electro-optic device 44. The illumination optical device 41 includes a light source device 411, a first lens array 412, a second lens array 413, a polarization converter 414 and a condenser lens 415.

The optical device 411 includes a discharge lamp 5 for radiating light beams, a main-reflecting mirror 6 for reflecting the light beams radiated by the discharge lamp 5 to converge the light beams to a predetermined position, a collimating concave lens 7 for collimating the light beams having been reflected and converged by the main-reflecting mirror 6 parallel to an illumination optical axis A and a housing (not shown) for internally housing the above components. Arrangements of the discharge lamp 5 and the main-reflecting mirror 6 will be described later.

In the first lens array 412, plural small lenses are arrayed in a matrix in a plane substantially orthogonal to the illumination optical axis A. The small lenses each have a substantially rectangular contour when seen from a direction of the illumination optical axis A. The small lenses each split the light beams from the light source device 411 into plural partial light beams.

The second lens array 413 is arranged the same as the first lens array 412, in which plural small lenses are arrayed in a matrix respectively corresponding to the small lenses of the first lens array 412. The second lens array 413, together with the condenser lens 415, focuses images from the small lenses of the first lens array on the image formation area of the later-described liquid crystal display panel 442 of the electro-optic device 44.

The polarization converter 414, which is disposed between the second lens array 413 and the condenser lens 415, converts the light beams from the second lens array 413 into substantially one linearly-polarized light beam.

Specifically, the partial light beams, which have been converted into substantially one linearly-polarized light beam by the polarization converter 414, are substantially superposed eventually on the image formation area of the later-described liquid crystal display panel 442 by the condenser lens 415. A projector using a liquid crystal display panel adapted to modulate polarized light can only utilize one polarized light, so that such a projector cannot use substantially a half of the light from the light source device 411 that randomly emits polarized light. In view of the above, by using the polarization converter 414, the light beams radiated by the light source device 411 are converted into one linearly-polarized light beam, thereby enhancing use efficiency of the light in the electro-optical device 44.

The color-separating optical device 42, which includes two dichroic mirrors 421, 422 and a reflecting mirror 423, separates the plural partial light beams from the illumination optical device 41 into three color lights of red (R), green (G) and blue (B) by using the dichroic mirrors 421, 422.

The relay optical device 43, which includes an incident-side lens 431, a relay lens 433 and reflecting mirrors 432, 434, guides the red-color light separated therefrom by the color-separating optical device 42 to a liquid crystal display panel 442R for red-color light.

At this time, the dichroic mirror 421 of the color-separating optical device 42 transmits a red-color light component and a green-color light component of the light beams from the illumination optical device 41 while reflecting a blue-color light component thereof. The blue-color light reflected by the dichroic mirror 421 is further reflected by the reflected mirror 423, so that the reflected blue-color light travels to a liquid crystal display panel 442B for blue-color light through a field lens 441. The field lens 441 converts each partial light beam from the second lens array 413 into a light beam that is parallel to its center axis (main light ray). Field lenses 441 respectively provided on light-incident sides of the liquid crystal display panels 442G, 442R for green-color light and for red-color light are arranged the same as the above field lens 441.

The green-color light, which has been transmitted through the dichroic mirror 421, is reflected by the dichroic mirror 422, so that the reflected green-color light travels the liquid crystal display panel 442G for green-color light through the field lens 441. On the other hand, the red-color light, which has been transmitted through the dichroic mirror 421, is further transmitted through the dichroic mirror 422 to pass through the relay optical device 43. Then, the red-color light further passes through the field lens 441 to reach the liquid crystal display panel 442R. The relay optical device 43 is used for the red-color light in order to prevent reduction in use efficiency of the light caused by diffusion of the light or the like because an optical path of the red-color light is longer than those of the other color lights. In other words, the relay optical device 43 is used in order to deliver to the field lens 411 the partial light beams incident on the incident-side lens 431 in its entirety. While an arrangement in which the red-color light passes through the relay optical device 43 among the three color lights has been described above, the arrangement is not limited thereto but the blue-color light may pass through the relay optical device 43.

The electro-optic device 44 modulates the color lights from the color-separating optical device 42 respectively based on the image information and generates an optical image (color image) by combining the modulated color lights.

As shown in FIG. 1, the electro-optic device 44 includes: the field lenses 441; the liquid crystal display panels 442 as an optical modulator (the liquid crystal display panels for the red, green and blue-color lights will be denoted by numerals 442R, 442G and 442B respectively); three incident-side polarization plates 443 disposed on the light-incident sides of the liquid crystal display panels 442 respectively, three viewing-angle compensating plates 444 disposed on light-exit sides of the liquid crystal display panels 442 respectively; three exit-side polarization plates 445 disposed on the light-exit sides of the three viewing-angle compensating plates 444 respectively; and a cross dichroic prism 446 as a color-combining optical device.

Each color light, of which polarization direction has been collimated in substantially one polarization direction by the polarization converter 414, is incident on each incident-side polarization plate 443. The incident-side polarization plate 443 transmits only polarized light beams of which polarization directions substantially coincide with the one polarization direction resulting from the collimation by the polarization converter 414, and absorbs the other light beams. The incident-side polarization plate 443 is provided by, for instance, attaching a polarization layer onto a light-transmissive substrate made of sapphire glass, crystal or the like.

Each liquid crystal display panel 442 as the optical modulator, of which detailed illustration is omitted, is structured such that liquid crystal as an electro-optic material is encapsulated between a pair of transparent glass substrates in a sealed manner. In the liquid crystal display panel 442, orientation of the liquid crystal is controlled based on a driving signal (image signal) input from the above-described control unit so as to modulate the polarization directions of the polarized light beams from the incident-side polarization plate 443, thereby generating the image light.

Each viewing-angle compensating plate 444 compensates a phase difference between ordinary light and extraordinary light due to a birefringence generated in the liquid crystal display panel 442 when the light beams are obliquely incident on the liquid crystal display panel 442, e.g., when the light beams are incident thereon obliquely to a normal-line direction of the panel surface.

Among the light beams that enter each exit-side polarization plate 445 after being exited from the liquid crystal display panel 442 and passing through the viewing-angle compensating plate 444, the exit-side polarization plate 445 transmits only light beams of which polarization directions are perpendicular to transmission axes of the light beams transmitted through the incident-side polarization plate 443, and absorbs the other light beams. The exit-side polarization plate 445 may be configured in the same manner as the above-described incident-side polarization plate 443.

The cross dichroic prism 446 combines the modulated lights generated by modulation of the color lights exited from the exit-side polarization plates 445, and generates an optical image (color image). The cross dichroic prism 446 is square in top view with four right-angle prisms being mutually attached together. Boundary faces at which the right-angle prisms are mutually attached together are provided with two multilayered derivative layers. The multilayered derivative layers transmit the color light exited from the exit-side polarization plate 445 disposed to face the projection lens 3 (i.e., the plate 445 disposed at the green-color light side) while reflecting the color lights exited from the other two exit-side polarization plates 445 (i.e., the plates 445 disposed at the red-color light side and the blue-color light side respectively). With this arrangement, the color lights modulated by the incident-side polarization plates 443, the liquid crystal display panels 442, the viewing-angle compensating plates 444 and the exit-side polarization plates 445 are combined, whereby a color image is generated.

Arrangement of Discharge Lamp 5

Figure 2:
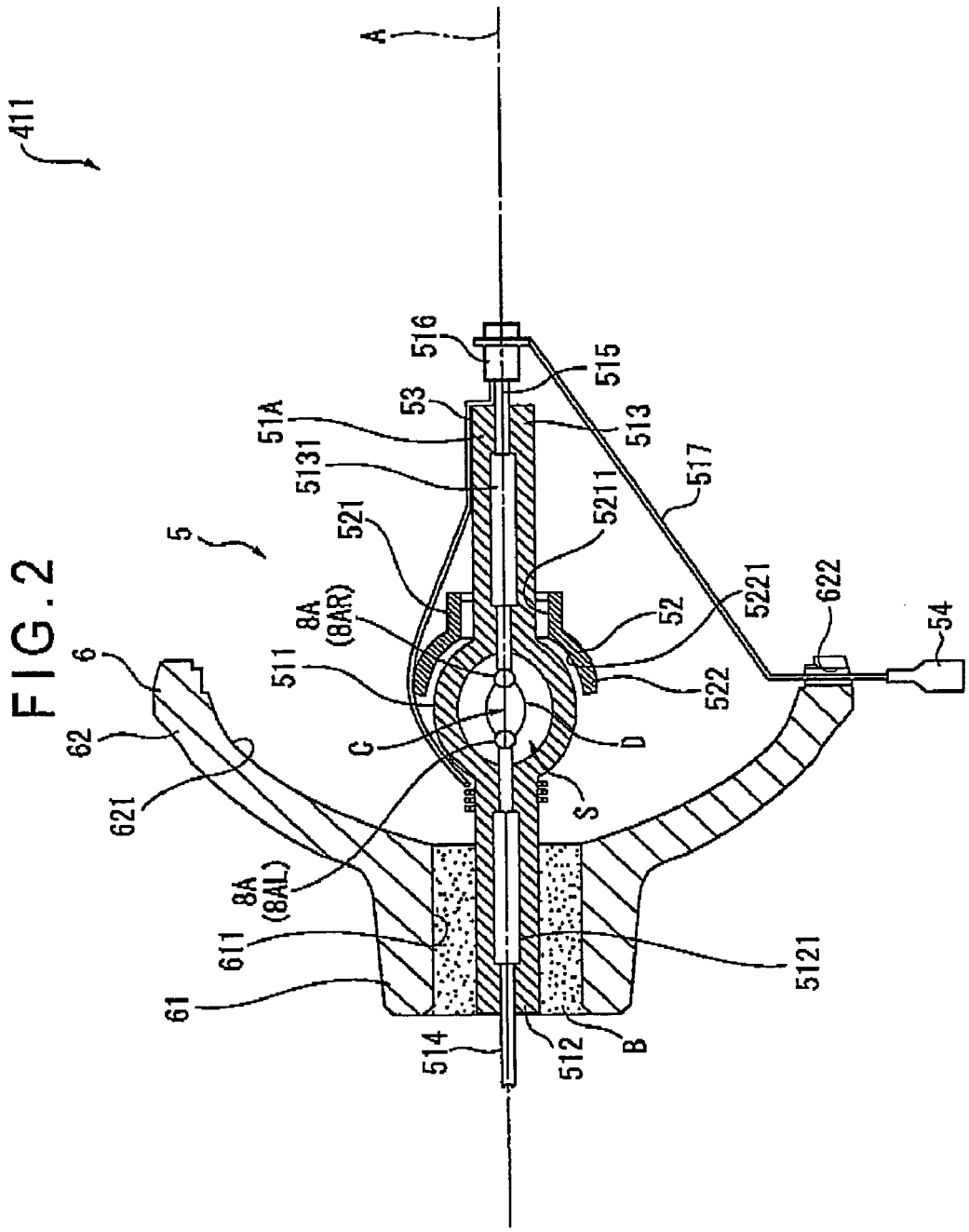
FIG. 2 is a vertical sectional view showing a discharge lamp and a main-reflecting mirror according to the exemplary embodiment.

FIG. 2 is a vertical sectional view showing the discharge lamp 5 and the main-reflecting mirror 6 of the light source device 411.

As shown in FIG. 2, the discharge lamp 5, which is a light source that emits light by an application of voltage, includes: a discharge lamp 51A made of quartz glass; and a sub-reflecting mirror 52 and a trigger wire 53 mounted on the discharge lamp 51A. The discharge lamp 5 may be selected from various discharge light-source lamps that emit light of high luminance, examples of which are a metal halide lamp, a high-pressure mercury lamp and ultrahigh-pressure mercury lamp.

Arrangement of Discharge lamp 51A

The discharge lamp 51A includes: an emitting portion 511 formed in the central portion of the discharge lamp 51A and bulged to form substantially a spherical shape; and a pair of sealing portions 512, 513 each extending from an end of the emitting portion 511 in a direction to be apart from the other. A sealing portion located on the left side of FIG. 2 will be denoted by the numeral 512 while a sealing portion located on the right side of FIG. 2 will be denoted by the numeral 513.

In the emitting portion 511, a pair of electrodes 8A are disposed (an electrode located adjacent to the sealing portion 512 will be denoted by a numeral 8AL while an electrode located adjacent to the sealing portion 513 will be denoted by a numeral 8AR). Between the pair of electrodes 8A, a discharge space S within which an emitting material that contains mercury, rare gas and a small amount of halogen is encapsulated is provided.

Metal foils 5121, 5131 made of molybdenum are inserted respectively into the sealing portions 512, 513, and electrically connected respectively to the electrodes 8AL, 8AR of the emitting portion 511. Ends of the sealing portions 512, 513 opposite to the emitting portion 511 are sealed with a glass material or the like. The metal foils 5121, 5131 are further connected with electrode-connecting wires 514, 515 respectively. The electrode-connecting wires 514, 515 extend outward from the discharge lamp 51A. When a voltage is applied on the electrode-connecting wires 514, 515 by a lighting controller for controlling lighting of the discharge lamp 5, an electric potential difference is generated between the electrodes 8AL and 8AR via the metal foils 5121, 5131, so that an electric discharge is generated. An arc image D is accordingly generated, and the inside of the emitting portion 511 emits light.

Arrangement of Main-Reflecting Mirror 6

The main-reflecting mirror 6 will be described.

The main-reflecting mirror 6, which is equivalent to a reflecting mirror according to the aspect of the invention, is a single-piece molded article made of glass that reflects light incident thereon so as to focus the light on a second focal point on an illumination optical axis A. The main-reflecting mirror 6 is fixed to the sealing portion 512 of the discharge lamp 5 (i.e., the sealing portion 512 positioned adjacent to a base end of a light-beams irradiation direction of the light source device 411 in which light beams are irradiated) by an adhesive B. The main-reflecting mirror 6 includes: a substantially cylindrical neck portion 61 into which the sealing portion 512 is inserted; and a concavely-curved reflecting portion 62 widened from the neck portion 61.

Among the above, a rotary-curved surface of the reflecting portion 62 that faces the emitting portion 511 is provided with a reflecting surface 621 on which a metal thin film is deposited. The reflecting surface 621 is a cold mirror for reflecting visible light while transmitting infrared light and ultraviolet light.

The neck portion 61 is provided with a substantially circular opening 611 in top view, into which the sealing portion 512 is inserted. The adhesive B is injected into the opening 611 while the sealing portion 512 remains inserted therein, so that the sealing portion 512 and the main-reflecting mirror 6 are bonded together in a fixed manner. At this time, the positions of the discharge lamp 5 and the main-reflecting mirror 6 are set such that the center position C of the arc image D (i.e., the arc image D generated by an arc discharge between later-described bodies 8A21 of the electrodes 8A) in the emitting portion 511 of the discharge lamp 5 is located in the vicinity of a first focus point of the reflecting surface 621 of the main-reflecting mirror 6.

While the main-reflecting mirror 6 is provided by an ellipsoidal reflector having an ellipsoid of revolution in this exemplary embodiment, the main-reflecting mirror 6 may be provided by a parabolic reflector. When a parabolic reflector is used as the main-reflecting mirror 6, the collimating concave lens 7 is not provided. Alternatively, the main-reflecting mirror 6 may be provided by a freely-curved reflector.

Arrangement of Sub-Reflecting Mirror 52

The sub-reflecting mirror 52, which is equivalent to a sub-mirror according to the aspect of the invention, is a molded article made of glass to be attached to the sealing portion 513 of the discharge lamp 51A (i.e., the sealing portion 513 located opposite to a side where the main-reflecting mirror 6 is attached). The sub-reflecting mirror 52 is made of the same material as the discharge lamp 51A. The sub-reflecting mirror 52 includes: a substantially cylindrical neck portion 521 having an opening 5211 into which the sealing portion 513 is inserted; and a reflecting portion 522 widened from the neck portion 521.

Among the above, the reflecting portion 522 is disposed to cover a portion of the emitting portion 511 adjacent to the sealing portion 513 (i.e., a portion adjacent to a front end of the light-beams irradiation direction of the light source device 411) when the sub-reflecting mirror 52 is attached to the sealing portion 513. The reflecting portion 522 is shaped like a bowl so as to follow a contour of the emitting portion 511. A surface of the reflecting portion 522 that faces the emitting portion 511 is provided with a reflecting surface 5221. The reflecting surface 5221 is a cold mirror for reflecting visible light while transmitting infrared light and ultraviolet light.

By attaching the sub-reflecting mirror 52 to the discharge lamp 51A, light beams irradiated by the emitting portion 511 and traveling in a direction opposite to the main-reflecting mirror 6 are reflected by the reflecting surface 5221 to be incident on the reflecting surface 621 of the main-reflecting mirror 6. With this arrangement, as with light beams irradiated by the emitting portion 511 and directly incident on the reflecting surface 621, the light beams traveling in the opposite direction are reflected by the reflecting surface 621 to be focused on the second focal point. Accordingly, it is possible to restrain the generation of the light beams that are directly irradiated from the emitting portion 511 toward the front end of the light-beams irradiation direction of the light source device 411 and are not incident on the first lens array 412 positioned in a downstream of the optical path of the light source device 411.

Arrangement of Trigger Wire 53

The trigger wire 53 is a trigger assisting wire for enhancing lightability of the discharge lamp 51A. A first end of the trigger wire 53 is wound around the sealing portion 512 in a coiled manner, a central portion of the trigger wire 53 is disposed along the sub-reflecting mirror 52 and the sealing portion 513 externally to the sub-reflecting mirror 52 and the sealing portion 513, and a second end of the trigger wire 53 is connected to the electrode-connecting wire 515 via a connector 516. The connector 516 is connected with a first end of a lead wire 517 that extends outward from the main-reflecting mirror 6 through an insertion hole 622 formed in the vicinity of an end periphery of the reflecting portion 62 of the main-reflecting mirror 6. A second end of the lead wire 517 is connected to a terminal 54 used for applying a voltage on the electrode-connecting wire 515 and the trigger wire 53.

By providing the trigger wire 53 and applying high-pressure pulse voltage on the trigger wire 53, lightability of the discharge lamp 5 can be enhanced.

Arrangement of Electrode 8A

Figure 3:
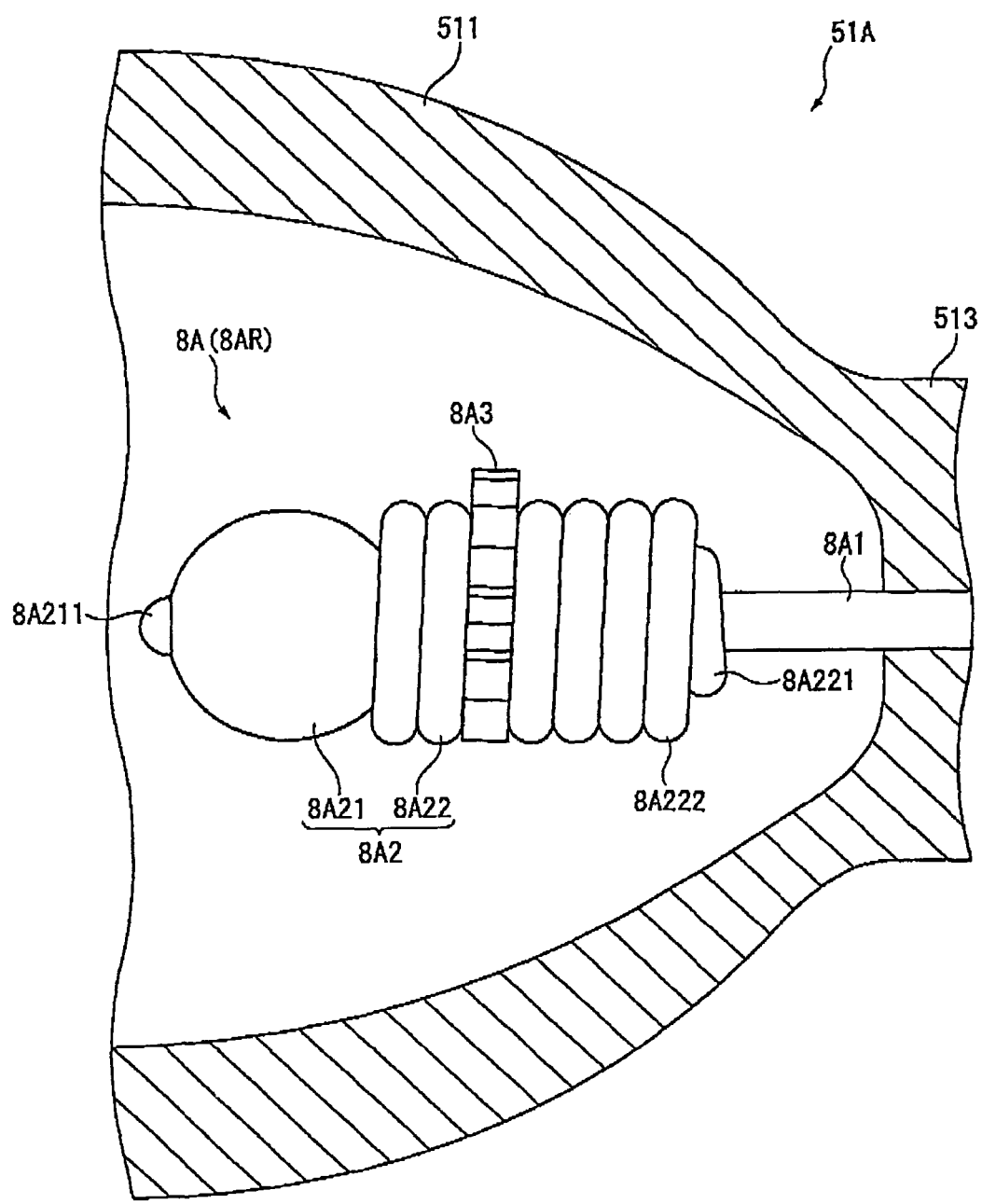
FIG. 3 is a side view showing an electrode according to the exemplary embodiment.

FIG. 3 is a side view showing the electrode 8AR.

As described above, the pair of electrodes 8A includes the electrode 8AL disposed adjacent to the sealing portion 512 (i.e., adjacent to the side where the sub-reflecting mirror 52 is not provided in the emitting portion 511) and the electrode 8A disposed adjacent to the sealing portion 513 (i.e., adjacent to the side where the sub-reflecting mirror 522 is provided in the emitting portion 511).

As shown in FIG. 3, the electrode 8AR includes: a small-diameter portion 8A1 of which portion in the vicinity of its rear end (i.e., an end spaced apart from the electrode 8AL) is connected to the above-described metal foil 5131; and a large-diameter portion 8A2 provided adjacent to a front end of the small-diameter portion 8A1 (i.e., an end adjacent to the electrode 8AL).

The small-diameter portion 8A1 is a core stick made of tungsten.

The large-diameter portion 8A2, which is provided adjacent to the front end of the small-diameter portion 8A1, includes: a substantially spherical body 8A21 formed integrally with the small-diameter portion 8A1; and a coil 8A22 connected to a rear end of the body 8A21. Specifically, the large-diameter portion 8A2 includes: the coil 8A22 wound along an axial direction of the small-diameter portion 8A1; and the body 8A21 located closer to the electrode 8AL than the coil 8A22 is.

A diameter of the body 8A21 is substantially the same as that of the coil 8A22. A bulged portion 8A211 bulged outward from the body 8A21 is provided substantially at the center of a surface of the body 8A21, the surface being closer to the electrode 8AL. When an electric discharge is effected with rated electric power between the bulged portion 8A211 and the bulged portion 8A211 of the electrode 8AL, the lighting of the discharge lamp 51A becomes steady.

The coil 8A22 is configured as a double-layer coil having an inner layer and an outer layer. Specifically, the coil 8A22 is configured such that the inner layer 8A221 is provided by winding a wire of tungsten in a direction from the front end side toward the rear end side of the small-diameter portion 8A1 by a predetermined winding number (six windings in this exemplary embodiment) while the outer layer 8A222 is provided by winding a wire of tungsten in a direction from a rear end toward a front end of the inner layer by the same winding number. Both ends of the wire are connected to the body 8A21 so that heat conducted to the coil 8A22 is conducted to the body 8A21.

Between substantially the axial center of the coil 8A22 and the front end of the coil 8A22, a circular component 8A3 from which an electric discharge at the time of igniting the lighting of the discharge lamp 5 is started is mounted integrally therewith by heat treating such as laser irradiation. As long as the circular component 8A3 is fixed on the coil 8A22, the circular component 8A3 is not necessarily required to experience heat treating or the like.

Figure 4:
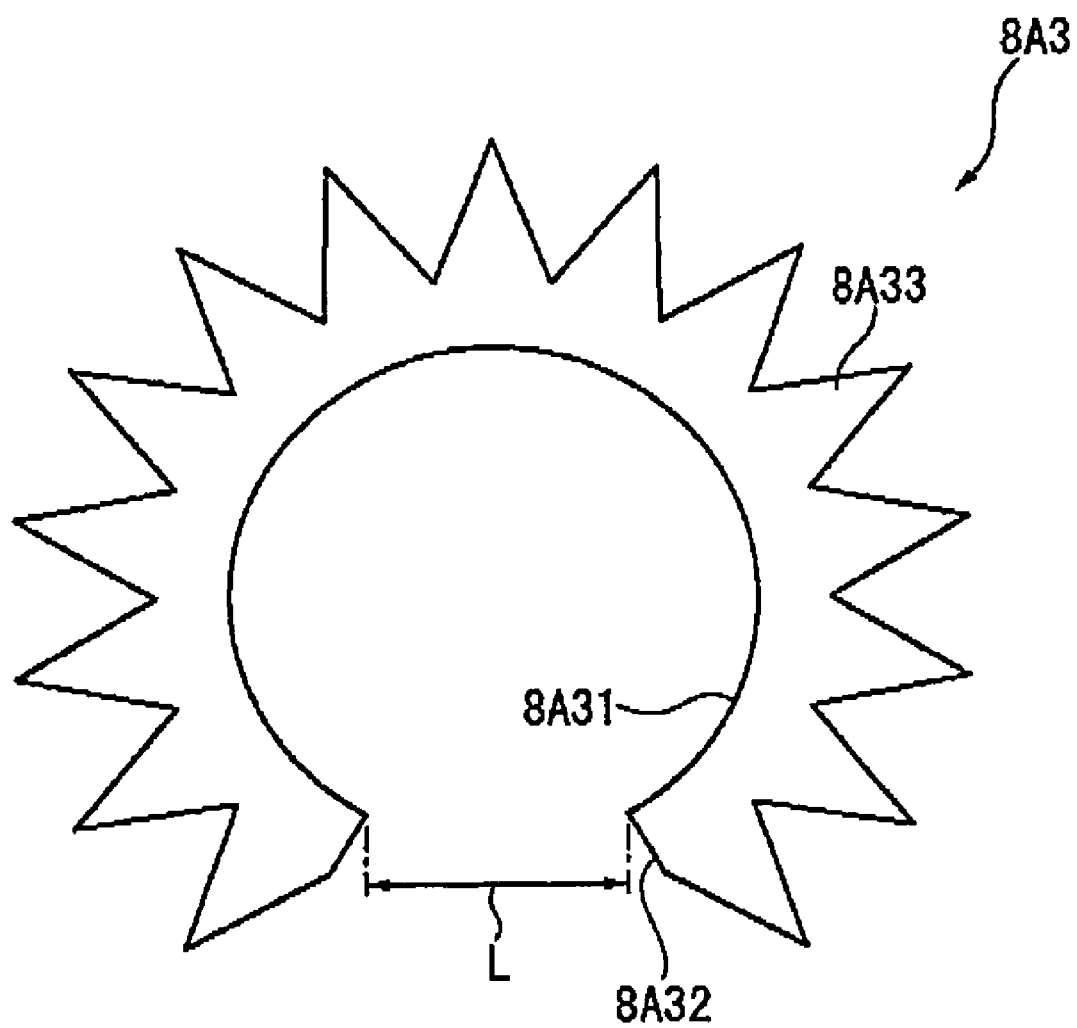
FIG. 4 is a front view showing a circular component according to the exemplary embodiment.

FIG. 4 is a front view showing the circular component 8A3. In other words, FIG. 4 shows the circular component 8A3 to be mounted on the coil 8A22 when seen in a direction along the axis of the coil 8A22.

As shown in FIG. 4, the circular component 8A3, which is equivalent to a projecting part according to the aspect of the invention, is a substantially circular-shaped (more specifically, substantially C-shaped) member made of a material prepared by adding a trigger assisting material (e.g. thorium) to tungsten. Substantially the center of the circular component 8A3 is provided with a substantially circular opening 8A31 in top view, into which the inner layer 8A221 of the coil 8A22 is inserted. A diameter of the opening 8A31 is substantially the same as that of the inner layer 8A221.

In addition, a cutout 8A32 connected to the opening 8A31 is provided in the vicinity of a first end of the circular component 8A3 (lower side in FIG. 4) along the axial direction of the circular component 8A3. A dimension L of the cutout 8A32 is set to be larger than the diameter of the small-diameter portion 8A1 and smaller than the diameter of the coil 8A22. With this arrangement, when mounted on the coil 8A22, the circular component 8A3 is positioned to be sandwiched between one winding portion of the outer layer 8A222 of the coil 8A22 and another winding portion wound around the inner layer 8A221 subsequent to the one winding portion.

Furthermore, an outer periphery of the circular component 8A3 is provided with plural protrusions 8A33 that project radially outward therefrom, i.e., radially around the center of the circular component 8A3. Each protrusion 8A33 narrows as extending to its tip end. The tip end of the protrusion 8A33, which is spaced the most apart from the center of the large-diameter portion 8A2, projects outward from the large-diameter portion 8A2.

In this exemplary embodiment, while the electrode 8AL includes the small-diameter portion 8A1 and the large-diameter portion 8A2, the circular component 8A3 is not provided on the electrode 8AL unlike the electrode 8AR.

Starting Point of Discharge When Igniting Lighting of Discharge Lamp 5

A starting point of an electric discharge when igniting lighting of the discharge lamp 5 will be described.

With a voltage being applied on the pair of electrodes 8A (electrodes 8AL, 8AR) of the discharge lamp 5 via the electrode-connecting wires 514, 515 and the metal foils 5121, 5131, an electric discharge is started at the electrodes 8A. Such an electric discharge tends to be effected at step portions and projecting portions such as rear ends of the inner layer 8A221 and the outer layer 8A222 of the coil 8A22. Particularly in the electrode 8AR, such an electric discharge tends to be effected at the protrusions 8A33 of the circular component 8A3. With the circular component 8A3 being mounted, the electrode 8AR provides the largest step portions, at which an electric field is the most intensively generated. Thus, an electric discharge tends to be started at the circular component 8A3 (particularly from the protrusions 8A33). Accordingly, the starting point of an electric discharge is placed on the tip ends of the protrusions 8A33 of the circular component 8A3, such that an electric discharge is started at the tip ends thereof when lighting of the discharge lamp is initiated.

Among the protrusions 8A33, a protrusion at which an electric discharge is started is a protrusion 8A33 that faces the above-described trigger wire 53. Hence, by disposing the circular component 8A3 such that any one of the plural protrusions 8A33 formed thereon faces the trigger wire 53, the starting point of an electric discharge can be reliably positioned on any one of the protrusions 8A33.

When an electric discharge is started at the tip end of the protrusion 8A33 as described above, heat generated by the electric discharge is conducted from the circular component 8A3 to the outer layer 8A222 of the coil 8A22 abutting on the circular component 8A3. Then, the heat is further conducted to the body 8A21 through the outer layer 8A222. When the body 8A21 is sufficiently heated by the heat conducted thereto as described above, an arc discharge is started between the bulged portion 8A211 provided on the front end of the body 8A21 and the bulged portion 8A211 of the other electrode 8AL.

According to the projector 1 of the above-described exemplary embodiment, the following advantages can be obtained.

1. Of the small-diameter portion 8A1 and the large-diameter portion 8A2 included in the electrode 8AR of the discharge lamp 51A, the circular component 8A3 as the projecting part is mounted on the large-diameter portion 8A2 so as to project outward from the large-diameter portion 8A2. When lighting of the discharge lamp 51A is initiated, an electric field is concentrated on projecting portions of the electrodes 8AL and 8AR, so that an electric discharge is started at the projecting portions. Thus, in the electrode 8AR, an electric discharge is started at a predetermined position on the outer periphery of the circular component 8A3 mounted on the large-diameter portion 8A2. At this time, even when the electrodes 8AL, 8AR are worn and tungsten is accumulated and crystallized in the small-diameter portion 8A1 at a position adjacent to the sealing portions 512, 513, the outer periphery of the circular component 8A3, which is intentionally provided at a portion of the electrode 8AR that is free from a risk of an abnormal electric discharge to the inner wall of the discharge lamp 51A, provides the point at which an electric field is the most intensively generated. Accordingly, by intentionally providing the circular component 8A3 on the large-diameter portion 8A2, the starting point of an electric discharge in the electrode 8AR can be placed on the circular component 8A3, not on the position where the tungsten is accumulated and crystallized.

2. Since the circular component 8A3 is mounted on the large-diameter portion 8A2, heat generated by an electric discharge at the circular component 8A3 is more easily conducted to the large-diameter portion 8A2. According to the above arrangement, since a temperature of the large-diameter portion 8A2 can be rapidly raised, an arc discharge between the bulged portions 8A211 of the bodies 8A21 can be rapidly initiated. Accordingly, not only triggering characteristics of the discharge lamp 51A can be enhanced, but also probability with which an arc collides on the inner wall of the discharge lamp can be reduced, thereby contributing to longer lifetimes of the electrode 8AR and the discharge lamp 51A.

3. The large-diameter portion 8A2, which is provided on the end of each electrode 8A that is closer to the other electrode 8A, has; the body 8A21 shaped as if the end of the small-diameter portion 8A1 that is closer to the other electrode 8A is bulged; and the coil 8A22 wound adjacent to the rear end of the body 8A21 (adjacent to the sealing portion 512, 513). With this arrangement, the diameter of the large-diameter portion 8A2 can be easily adjusted to correspond to wattage of the discharge lamp 51A by, for instance, adjusting the number of layers of the coil. In addition, heat capacity of the large-diameter portion 8A2 can be increased. Thus, it is possible to prevent wearing and deformation of the electrodes 8AL, 8AR, thereby contributing to further longer lifetimes of the electrodes 8AL, 8AR.

4. When the trigger wire 53 is provided on the discharge lamp 51A, an electric discharge tends to be started at the position in the large-diameter portion 8A2 that faces the trigger wire 53. Thus, by providing the circular component 8A3 as a projecting part on the large-diameter portion 5A2 of the electrode 8AR, the starting point of an electric discharge can be easily placed on any one of the positions in the circular component 8A3. Accordingly, the starting point of an electric discharge can be reliably set on the circular component 8A3.

5. On the circular component 8A3, the plural protrusions 8A33, each of which narrows its front end as extending outward and radially of the center of the circular component 8A3, are provided along the outer periphery of the circular component 8A3. An electric field tends to be concentrated particularly on protrusion-like portions having thin tip ends, so that an electric discharge tends to be started at such protrusion-like portions when the lighting of the discharge lamp 51A is initiated. With the arrangement where the circular component 8A3 is provided with the plural protrusions 8A33, the starting point of an electric discharge can be reliably placed on the protrusion 8A33 of the plural protrusions 8A33 that faces the trigger wire 53. Accordingly, the starting point of an electric discharge when the lighting is initiated can be more reliably placed on the circular component 8A3.

6. The circular component 8A3 is provided with the opening 8A31 into which the inner layer 8A221 of the coil 8A22 is inserted and the cutout 8A32 connected to the opening 8A31. The opening 8A31 is formed in the circular component 8A3 along the axial direction of the circular component 8A3. With this arrangement, the circular component 8A3 can be mounted on the coil 8A22 by fitting the inner layer 8A221 of the coil 8A22 into the opening 8A31 via the cutout 8A32. Thus, not only the circular component 8A3 can be positioned on the large-diameter portion 8A2, but also mounting of the circular component 8A3 on the large-diameter portion 8A2 can be facilitated.

7. The circular component 8A3 is disposed at a position between substantially the axial center of the large-diameter portion 8A2 and the front end of the large-diameter portion 8A2 (for instance, a position in the electrode 8AR adjacent to the electrode 8AL). More specifically, the circular component 8A3 is mounted between substantially the center of the coil 8A22, which corresponds to the above-described position, and the end of the coil 8A22 adjacent to the front end of the large-diameter portion 8A2. With this arrangement, a long distance can be retained between the inner wall of the emitting portion 511, which is substantially spherical around the center of a line connecting the electrodes 8AL and 8AR, and the protrusions. 8A33 of the circular component 8A3. Thus, an arc generated on the tip end of the protrusion 8A33 is prevented from colliding on the inner wall of the emitting portion 511. In addition, the above arrangement can maintain internal environment of the discharge space S while preventing generation of white turbidness and tanning of the discharge lamp 51A, thereby contributing to a longer life of the discharge lamp 51A.

8. The circular component 8A3 is made of a material prepared by adding a trigger assisting material such as thorium to tungsten (material for forming the electrode). With this arrangement, when the voltage is applied on the electrodes 8A, an electric discharge can be easily generated at the circular component 8A3. Accordingly, the starting point of an electric discharge can be more reliably placed on the circular component 8A3.

9. The emitting material (e.g., mercury) within the emitting portion 511 adheres to an electrode that is the more easily cooled of the two electrodes at the time of cooling after the lighting of the discharge lamp 51A is stopped. At this time, the electrode 8AR, which is disposed on the side where the sub-reflecting mirror 52 is provided, is less easily cooled because the electrode 8AR is warmed by the sub-reflecting mirror 52. On the other hand, the other electrode 8AL is easily cooled. Thus, the emitting material adheres to the electrode 8AL. When the voltage is subsequently applied on the electrodes 8AL and 8AR so as to light the discharge lamp 51A again, the electrode 8AL is buried in the emitting material adhering thereto. Accordingly, even when the circular component 8A3 is mounted on the electrode 8AL, the starting point of an electric discharge may not be suitably placed on the circular component 8A3.

In contrast, the circular component 8A3 is mounted on the electrode 8AR, which is located on the side where the sub-reflecting mirror 52 is provided in the emitting portion 511, and to which the emitting layer tends not to adhere at the time of cooling. With this arrangement, since the circular component 8A3 on the electrode 8AR is exposed when the lighting of the discharge lamp 51A is initiated, the starting point of an electric discharge can be reliably placed on the above-described circular component 8A3.

Thus, with an arrangement where the circular component 8A3 is provided only on the electrode 8AR, which is exposed when the lighting of the discharge lamp 51A is initiated, simplification of manufacturing processes of the discharge lamp 51A and reduction in manufacturing cost of the discharge lamp 51A can be realized as compared with an arrangement where the circular component 8A3 is provided on each of the electrodes 8AL and 8AR.

2. Second Exemplary Embodiment

Next, a projector according to a second exemplary embodiment of the invention will be described.

The projector according to this exemplary embodiment is arranged basically in the same manner as the above-described projector 1. However, while the electrode 8A includes the circular component 8A3 as the projecting part in the above-described projector 1, a substantially conical protrusion as the projecting part is integrally mounted on the body in the projector according to this exemplary embodiment, which poses a difference between the projector according to this exemplary embodiment and the above-described projector 1. In the description made below, the same portions or substantially the same portions as the portions having been described will be denoted by the same numerals, description of which will be omitted.

The projector according to this exemplary embodiment is arranged in the same manner as the above-described projector 1 except that a discharge lamp 51B is included therein in place of the discharge lamp 51A.

The discharge lamp 51B includes the emitting portion 511, the pair of sealing portions 512, 513 and the electrode-connecting wires 514, 515. In the emitting portion 511, a pair of electrodes 8B respectively connected to the metal foils 5121, 5131 provided on the pair of sealing portions 512, 513 are disposed.

Figure 5:
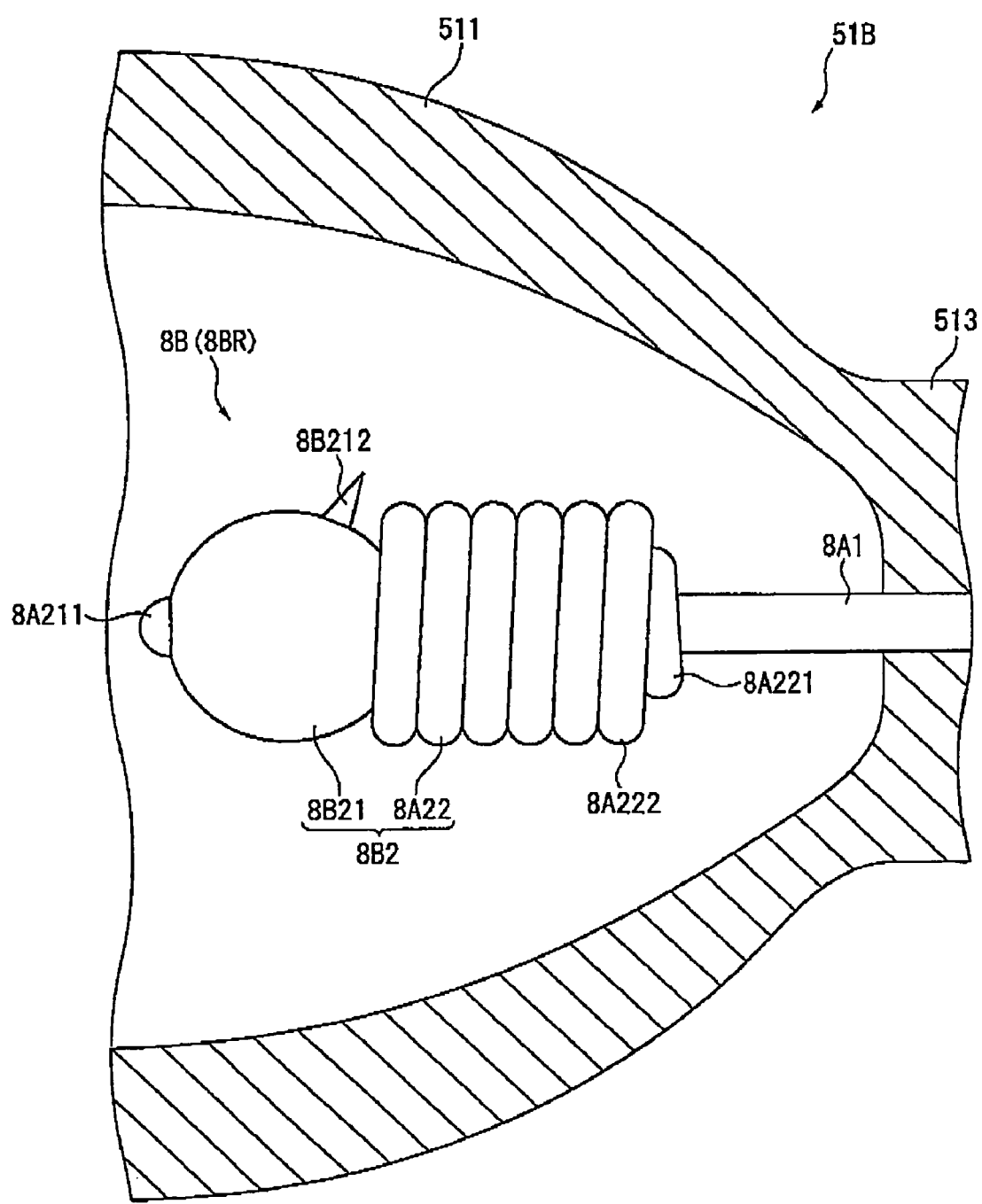
FIG. 5 is a side view showing an electrode included in a discharge lamp of a projector according to a second exemplary embodiment of the invention.

FIG. 5 is a side view showing an electrode 8BR according to this exemplary embodiment.

The pair of electrodes 8B include the electrode 8AL disposed adjacent to the sealing portion 512 and an electrode 8BR disposed adjacent to the sealing portion 513.

As shown in FIG. 5, the electrode 8BR includes: the small-diameter portion 8A1; and a large-diameter portion 8B2 provided on the front end side of the small diameter 8A1 (i.e., a side adjacent to the other electrode 8AL and apart from the sealing portion 513) and having a larger diameter than the small-diameter 8A1. The large-diameter portion 8A2 includes: a body 8B21 formed on the front end side of the small-diameter portion 8A1; and the double-layer coil 8A22 densely wound around the small-diameter portion 8A1 so as to be connected to the body 8B21.

As is the above-described body 8A21, the body 8B21 is bulged to form substantially a spherical shape of which diameter is substantially the same as that of the coil 8A22. The center of a front end of the body 8B21 is provided with the bulged portion 8A211. A portion of the body 8B21 adjacent to the above-described trigger wire 53 is provided with a protrusion 8B212 as the projecting part according to the aspect of the invention.

The protrusion 8B212, which is a substantially conical member prepared separately from the body 8B21, is formed by inserting the conical member into an insertion hole (not shown) formed near a rear end of the body 8B21 (adjacent to the coil 8A22) and subsequently heat-sealing the conical member thereto by laser irradiation or the like. The protrusion 8B212 is made of a material prepared by adding the above-described trigger assisting material to tungsten.

The protrusion 8B212 is mounted on the body 8B21 to project toward the rear end of the body 8B21 (i.e., project in a direction away from the other electrode 8AL and close to the sealing portion 513), and narrows its front end as extending in its projecting direction in which the protrusion 8B212 projects. In addition, the protrusion 8B212 is mounted on the body 8B21 at a position that faces the trigger wire 53. In other words, the trigger wire 53 is located in the projecting direction of the projecting 2B212.

With this arrangement, when the voltage is applied on the pair of electrodes 8B at the time of igniting the lighting of the discharge lamp 51B, an electric discharge is started at a tip end of the protrusion 8B212 in the electrode 8BR, so that heat generated by the discharge is conducted to the body 8B21. When the body 8B21 is sufficiently heated by the heat conducted thereto, an arc discharge is started between the bulged portion 8B211 of the body 8B21 and the bulged portion 8B211 of the other electrode 8AL.

According to the projector of the above-described exemplary embodiment, the following advantages can be obtained in addition to the above described advantages 3 and 9.

10. By intentionally providing the substantially-conical protrusion 8B212 outwardly projecting from the large-diameter portion 8B2 on the body 8B21 of the large-diameter portion 8B2 of the electrode 8BR, an electric field can be the most intensively generated at the tip end of the protrusion 8B212 of the electrode 8BR. With this arrangement, the starting point of an electric discharge when the lighting of the discharge lamp 51B is initiated can be placed on the tip end of the protrusion 8B212. Accordingly, even when the tungsten (the material for forming the electrode) is accumulated or crystallized on the small-diameter portion 8A1, the starting point of an electric discharge in the electrode 8BR can be placed on the tip end of the protrusion 8B212.

11. Since the protrusion 2B212 is provided on the body 8B21, where an electric discharge is generated when the discharge lamp is steadily lighted, heat produced by the discharge generated at the protrusion 8B212 can be directly conducted to the body 8B21 when the lighting of the discharge lamp 51B is initiated. With this arrangement, a temperature of the body 8B21 can be rapidly raised. Thus, an arc discharge can be rapidly initiated when the lighting of the discharge lamp 51B is initiated, thereby preventing generation of an abnormal electric discharge and wearing and deformation of the electrodes 8B.

12. With an arrangement where the protrusion 8B212 is provided on the body 8B21, a longer distance can be retained between the protrusion 8B212 and the inner wall of the emitting portion 511 as compared with an arrangement where the protrusion 8B212 is provided on the coil 8A22. Accordingly, collision of an arc to the inner wall can be prevented while internal environment of the discharge space S can be maintained. In addition, as compared with the arrangement where the conical member equivalent to the protrusion 8B212 is mounted on the coil 8A22, forming processes of the protrusion 8B212 can be simplified.

13. The projecting direction, in which the protrusion 8B212 provided on the electrode 8BR projects from the body 8B21, is set to coincide with a direction apart from the other electrode 8AL. With this arrangement, the starting point of an electric discharge is kept placed on the protrusion 8B212 until the body 8B21 is sufficiently heated.

In an arrangement where the projecting direction of the protrusion 8B212 is set to coincide with a direction close to the other electrode 8AL, an arc discharge may be generated continuously at the tip end of the protrusion 8B212 even after the body 8B21 is sufficiently heated. In such an instance, light may not be suitably incident on the above-described optical components, of which positions are determined based on the center of line connecting the electrodes 8B.

In contrast, since the projecting direction coincides with the direction away from the other electrode 8AL an arc discharge is generated in the electrode 8BR at the bulged portion 8B211 formed on the front end of the body 8B21 when the body 8B21 is sufficiently heated. Thus, the emitting center of the discharge lamp 51B can be located on the center of the line connecting the electrodes 8B in the steady state, and light can be reliably incident on the optical components included in the optical unit 4.

14. As is the above-described circular component 8A3, the protrusion 8B212 is made of a material prepared by adding an ignition assisting material such as thorium to tungsten (material for forming the electrode). With this arrangement, when the voltage is applied on the electrodes 8A, an electric discharge can be easily generated at the protrusion 8B212. Thus, the starting point of an electric discharge in the electrode 8BR can be more reliably placed on the protrusion 8B212.

15. As described above, the protrusion 8B212 projects not only in the direction away from the other electrode 8AL but also toward the trigger wire 53 disposed outside of the discharge lamp 51B. When the voltage is applied on the pair of electrodes 8B, an electric discharge is started at portion(s) of the pair of electrodes 8B that faces the trigger wire 53. With the arrangement where the protrusion 8B212 projects toward the trigger wire 53, the starting point of an electric discharge in the electrode 8BR when the lighting of the discharge lamp 51B is initiated can be more reliably placed on the protrusion 8B212.

3. Third Exemplary Embodiment

A projector according to a third exemplary embodiment of the invention will be described below.

The projector according to the third exemplary embodiment is arranged basically in the same manner as the projector according to the second exemplary embodiment. However, while the protrusion 8B212 is provided on the body 8B21 of the large-diameter portion 8B2 of the electrode 8BR in the projector according to the second exemplary embodiment, the protrusion is provided on the coil in the projector according to this exemplary embodiment. In this respect, the projector according to this exemplary embodiment is different from the projector according to the second exemplary embodiment. In the description made below, the same portions or substantially the same portions as the portions having been described will be denoted by the same numerals, description of which will be omitted.

The projector according to this exemplary embodiment is arranged in the same manner as the above-described projector according to the second exemplary embodiment except that a discharge lamp 51C is included therein in place of the discharge lamp 51B.

The discharge lamp 51C includes the emitting portion 511, the pair of sealing portions 512, 513 and the electrode-connecting wires 514, 515. In the emitting portion 511, a pair of electrodes 8C respectively connected to the metal foils 5121, 5131 provided on the pair of sealing portions 512, 513 are disposed.

Figure 6:
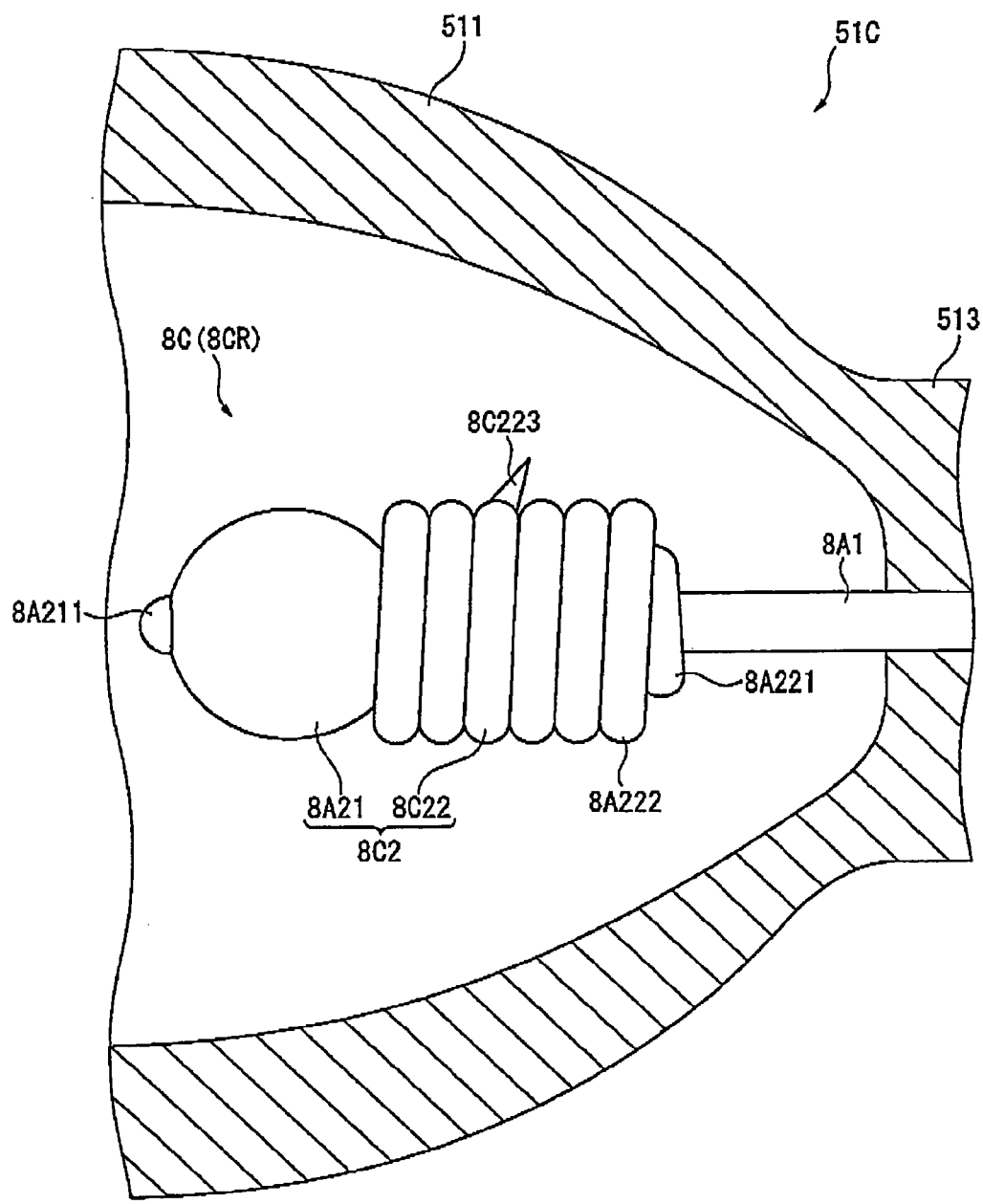
FIG. 6 is a side view showing an electrode included in a discharge lamp of a projector according to a third exemplary embodiment of the invention.

FIG. 6 is a side view showing an electrode 8CR according to this exemplary embodiment.

The pair of electrodes 8C include the electrode 8AL disposed adjacent to the sealing portion 512 and an electrode 8CR disposed adjacent to the sealing portion 513.

As shown in FIG. 6, the electrode 8CR includes: the small-diameter portion 8A1; and a large-diameter portion 8C2 provided adjacent to the front end of the small diameter 8A1 (i.e., a side adjacent to the other electrode 8AL and apart from the sealing portion 513) and having a larger diameter than the small-diameter 8A1.

The large-diameter portion 8C2 includes: the body 8A21; and a coil 8C22 connected to a rear end side of the body 8A21 and having the inner layer 8A221 and the outer layer 8A222. A diameter of the outer layer 8A222 is set to be substantially the same as that of the body 8A21. A substantially conical protrusion 8C223 is heat-sealed to a portion of the outer layer 8A222 that faces the trigger wire 53 (see FIG. 2) by laser irradiation or the like.

The protrusion 8C223, which is made of a material prepared by adding the ignition assisting material to tungsten as is the above-described protrusion 8B212, is mounted on an outer surface of the outer layer 8A222 at a position between substantially the center of the coil 8C22 and a front end (end adjacent to the body 8A21) of the coil 8C22.

The protrusion 8C223 projects from the outer layer 8A222 toward a rear end of the outer layer 8A222 (i.e., projects in a direction away from the other electrode 8AL and close to the sealing portion 513), and the trigger wire 53 is located in the direction the protrusion 8C223 projects.

According to the projector of the above-described exemplary embodiment, the following advantages can be obtained in addition to the above-described advantages 3, 9, 10, 11 and 13 to 15.

16. The coil 8C22 is less worn and less deformed than the body 8A21 even when the discharge lamp 51C is kept lighted for a long time. Accordingly, since the protrusion 8C223, from which an electric discharge in the electrode 8CR is started when the lighting of the discharge lamp 51C is initiated, is provided on the coil 8C22, deformation and the like of the protrusion 8C223 can be prevented even when the discharge lamp 51C is kept lighted for a long time. Thus, the tip end of the protrusion 8C223 can serve as the starting point of an electric discharge for a long time.

4. Fourth Exemplary Embodiment

Next, a projector according to a fourth exemplary embodiment of the invention will be described.

The projector according to this exemplary embodiment is arranged basically in the same manner as the above-described projector 1. However, while the electrode 8A includes the circular component 8A3 as the projecting part in the projector 1, the electrode includes a ring-shaped member as the projecting part in the projector according to this exemplary embodiment, which poses a difference between the projector according to this exemplary embodiment and the above-described projector 1. In the description made below, the same portions or substantially the same portions as the portions having been described will be denoted by the same numerals, description of which will be omitted.

Figure 7:
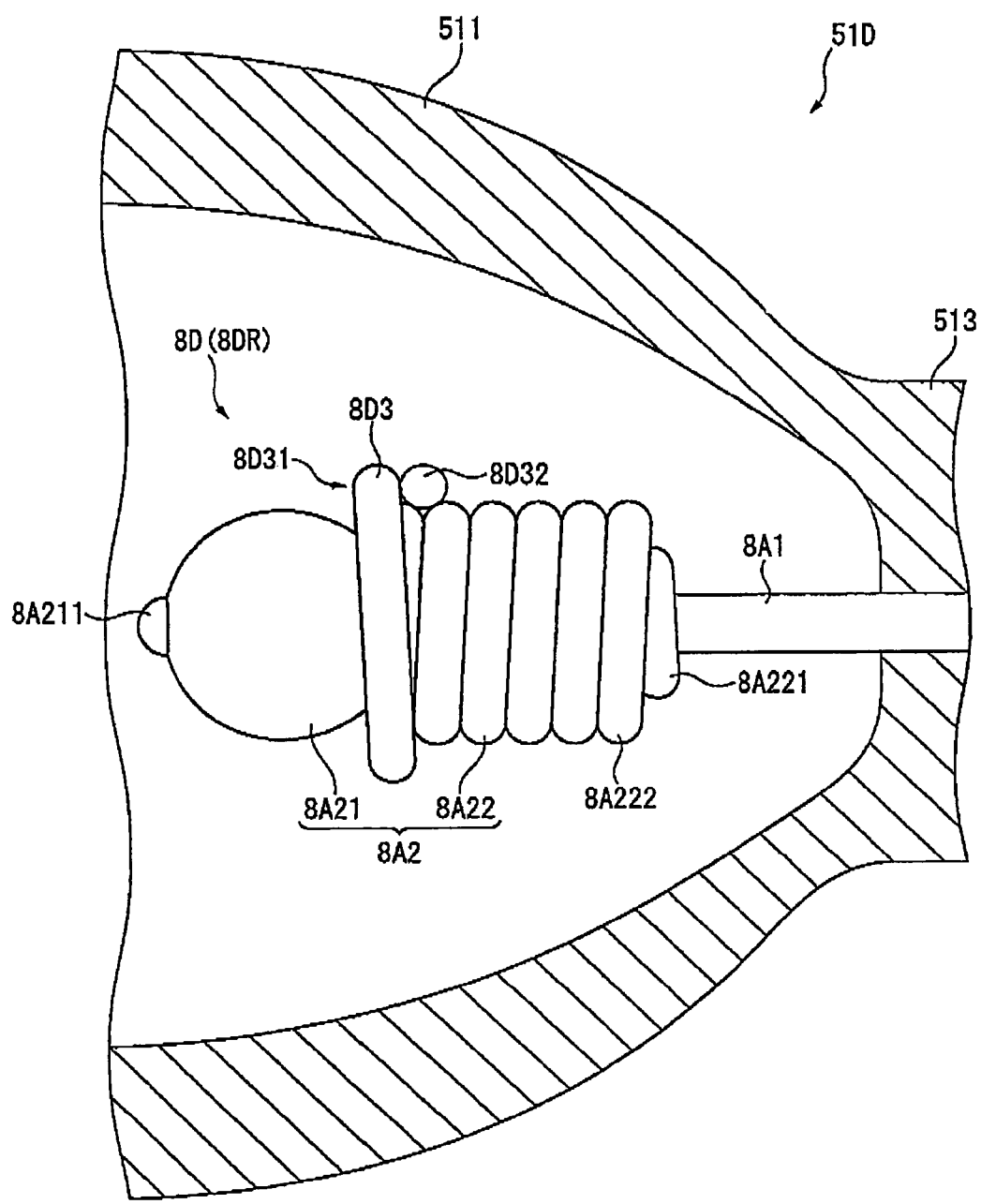
FIG. 7 is a side view showing an electrode included in a discharge lamp of a projector according to a fourth exemplary embodiment of the invention.

FIG. 7 is a side view showing an electrode 8DR according to this exemplary embodiment.

The projector according to this exemplary embodiment is arranged in the same manner as the above-described projector 1 except that a discharge lamp 51D is included therein in place of the discharge lamp 51A. The discharge lamp 51D is arranged in the same manner as the discharge lamp 51A except that electrodes 8D are included in place of the electrodes 8A. The electrodes 8D include the electrode 8AL disposed adjacent to the sealing portion 512 and an electrode 8DR disposed adjacent to the sealing portion 513.

As shown in FIG. 7, the electrode 8DR includes the small-diameter portion 8A1 and the large-diameter portion 8A2. A ring-shaped member 8D3 is provided on the large-diameter portion 8A2.

The ring-shaped member 8D3, which is equivalent to the projecting part and the circular component of the invention, is prepared separately from the electrode 8DR and provided on the electrode 8DR at a position between substantially the axial center of the coil 8A22 and the body 8A21 so that an outer periphery of the ring-shaped member 8D3 projects from an outer periphery of the large-diameter portion 8A2. The ring-shaped portion 8D3 is formed by winding a wire made of a material prepared by adding the above-described ignition assisting material to tungsten by one winding.

Specifically, the ring-shaped member 8D3 is a ring in which portions of the wire are in contact with each other along the axial direction of the ring-shaped member 8D3. An end 8D31 of the ring-shaped member 8D3 adjacent to the other electrode 8AL and an end 8D32 of the ring-shaped member 8D3 adjacent to the sealing portion 513 have a sheared shape as if the two ends are sheared in a direction orthogonal to the axial direction of the wire.

The ring-shaped member 8D3 is disposed such that, when the ring-shaped member 8D3 is mounted on the large-diameter portion 8A2, either one of the ends of the ring-shaped member 8D3 faces the above-described trigger wire 53 and a distance between the trigger wire 53 and the large-diameter portion 8A2 becomes shortest at the ring-shaped member 8D3.

Since the ends 8D31, 8D32 of the ring-shaped member 8D3 have a sheared shape, an electric field tends to be concentrated on the ends 8D31, 8D32. In addition, since an electric field tends to be concentrated on the end facing the trigger wire 53 as described above, the starting point of an electric discharge in the electrode 8DR can be placed on the above-described end when the lighting of the discharge lamp 51D is initiated.

The end of the ring-shaped member from which an electric discharge started is preferably the end 8D32 adjacent to the sealing portion 513. With this arrangement, as in the above-described protrusions 8B212 and 8C223, it is possible to prevent an arc discharge from being generated continuously at the end even after the electrode 8DR has been sufficiently heated.

According to the projector of the above-described exemplary embodiment, the following advantages can be obtained in addition to the advantages 1 to 4 and 7 to 9 exerted by the above-described projector 1.

17. By setting an inner diameter of the ring-shaped member 8D3 to conform to an outer diameter of the large-diameter portion 8A2, the ring-shaped member 8D3 formed by winding the wire by one winding can be easily mounted on the large-diameter portion 8A2 (coil 8A22) by, for instance, thrusting the ring-shaped member 8D3 in the large-diameter portion 8A2 (coil 8A22). In addition, by thrusting the ring-shaped member 8D3 in the large-diameter 8A2 as described above, not only the ring-shaped member 8D3 can be fixed to the large-diameter portion 8A2 without conducting a heat treating such as laser irradiation, but also an area at which the ring-shaped member 8D3 and the coil 8A22 are in contact with each other can be reduced. With this arrangement, heat resistance of the ring-shaped member 8D3 can be enhanced. Thus, a temperature of the ring-shaped member 8D3 can be rapidly raised and an arc discharge at the ring-shaped member 8D3 can be rapidly initiated.

5. Modifications of Exemplary Embodiments

While best arrangements and the like for implementing the invention have been disclosed in the above description, the invention is not limited thereto. Specifically, a shape, a material and the like described in the above disclosure merely serve as exemplification for facilitating an understanding of the invention, and do not serve as any limitations on the invention, so that what is described by a name of a component for which the description of the shape, material and the like are partially or totally removed is also within the scope of the invention.

While the circular component mounted on the large-diameter portion 8A2 of each electrode 8AL, 8AR has been exemplified as the circular component 8A3 including the opening 8A31, the cutout 8A32 and the plural protrusions 8A33 each of which narrows as extending radially outward in the above first exemplary embodiment, the invention is not limited thereto. As long as the circular component projects outward from the diameter of the large-diameter portion 8A2 when mounted on the large-diameter portion 8A2, the circular component may be of any other shape.

Figure 8:
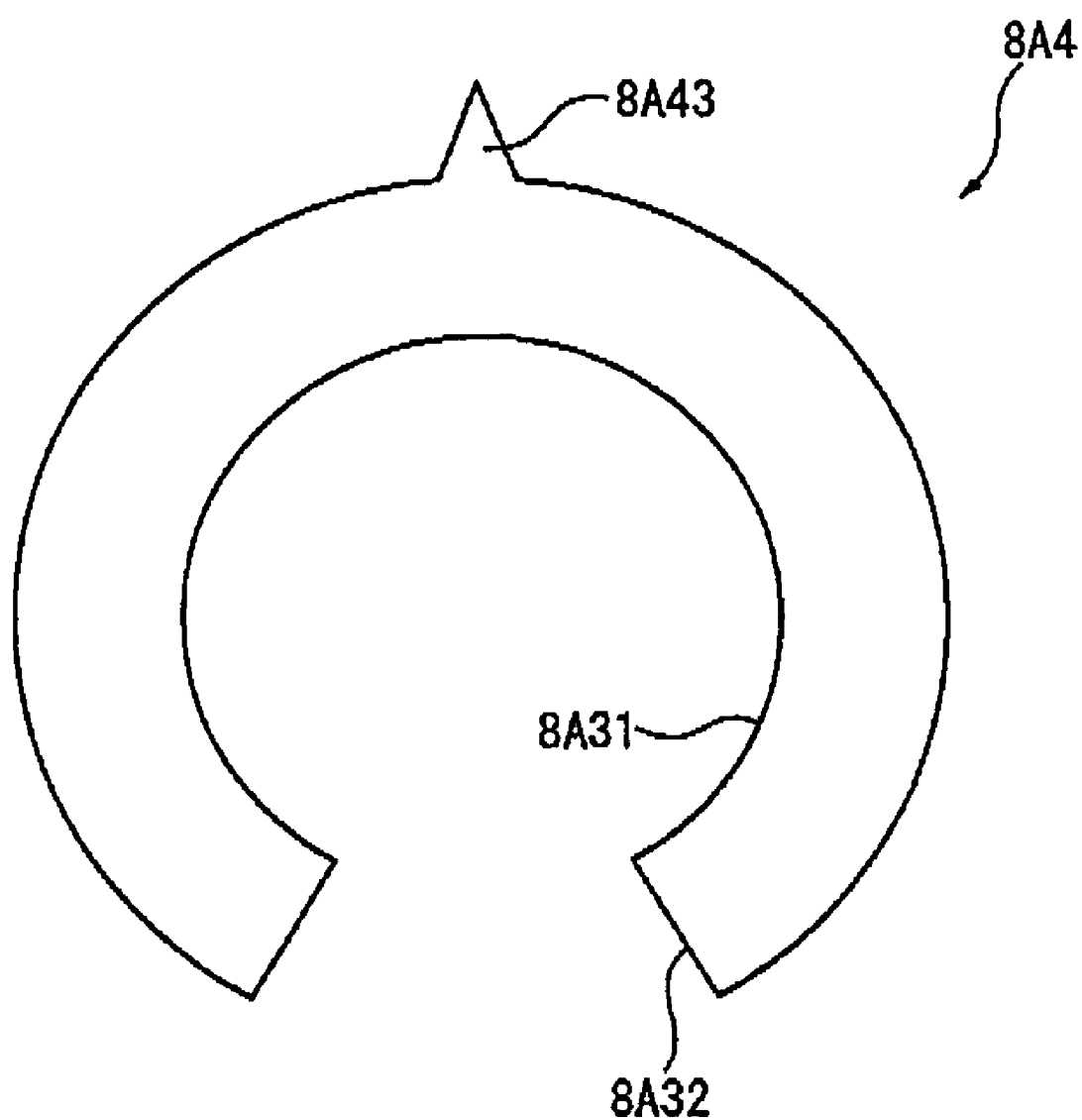
FIG. 8 is a front view showing a circular component according to a modification of each exemplary embodiment above.
Figure 9:
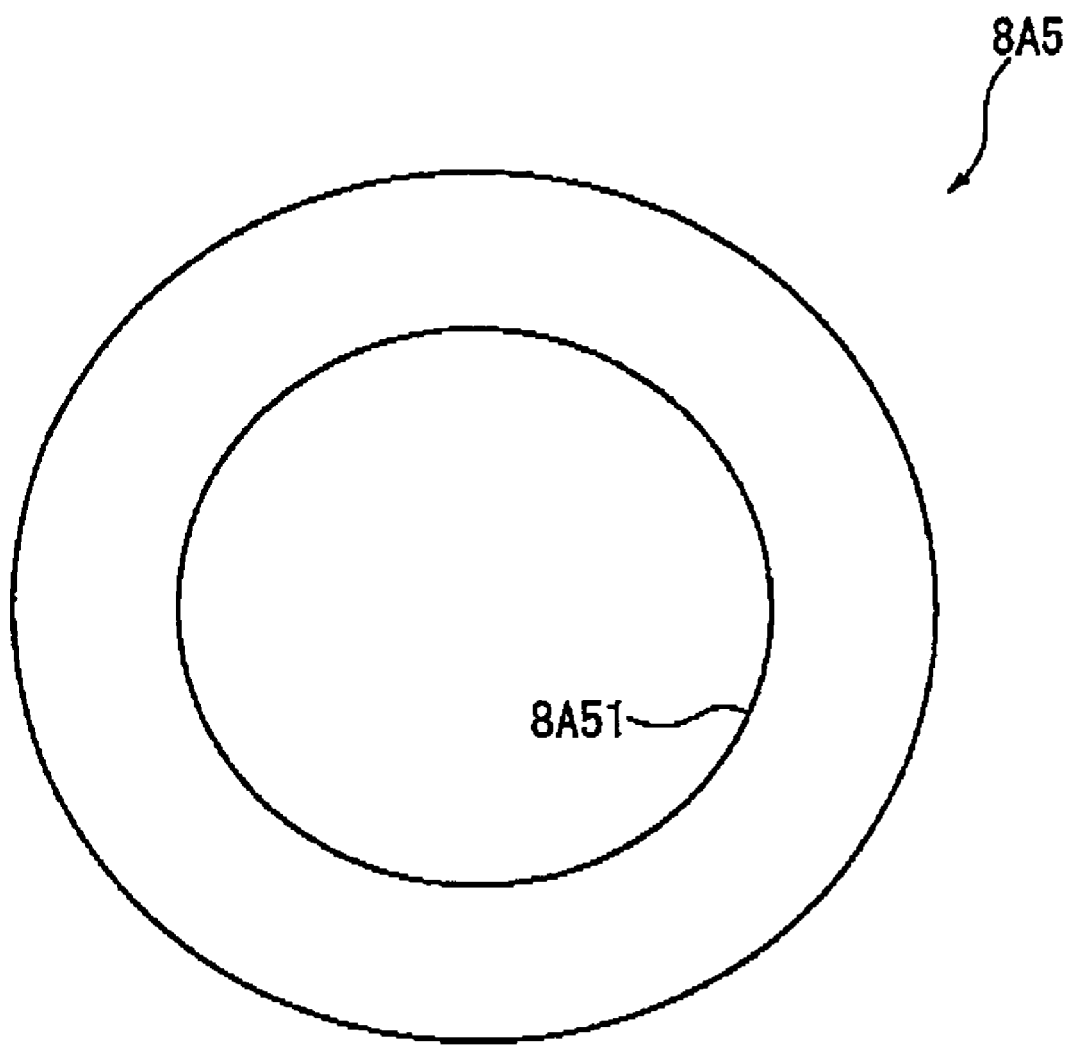
FIG. 9 is a front view showing a circular component according to another modification of each exemplary embodiment above.
Figure 10:
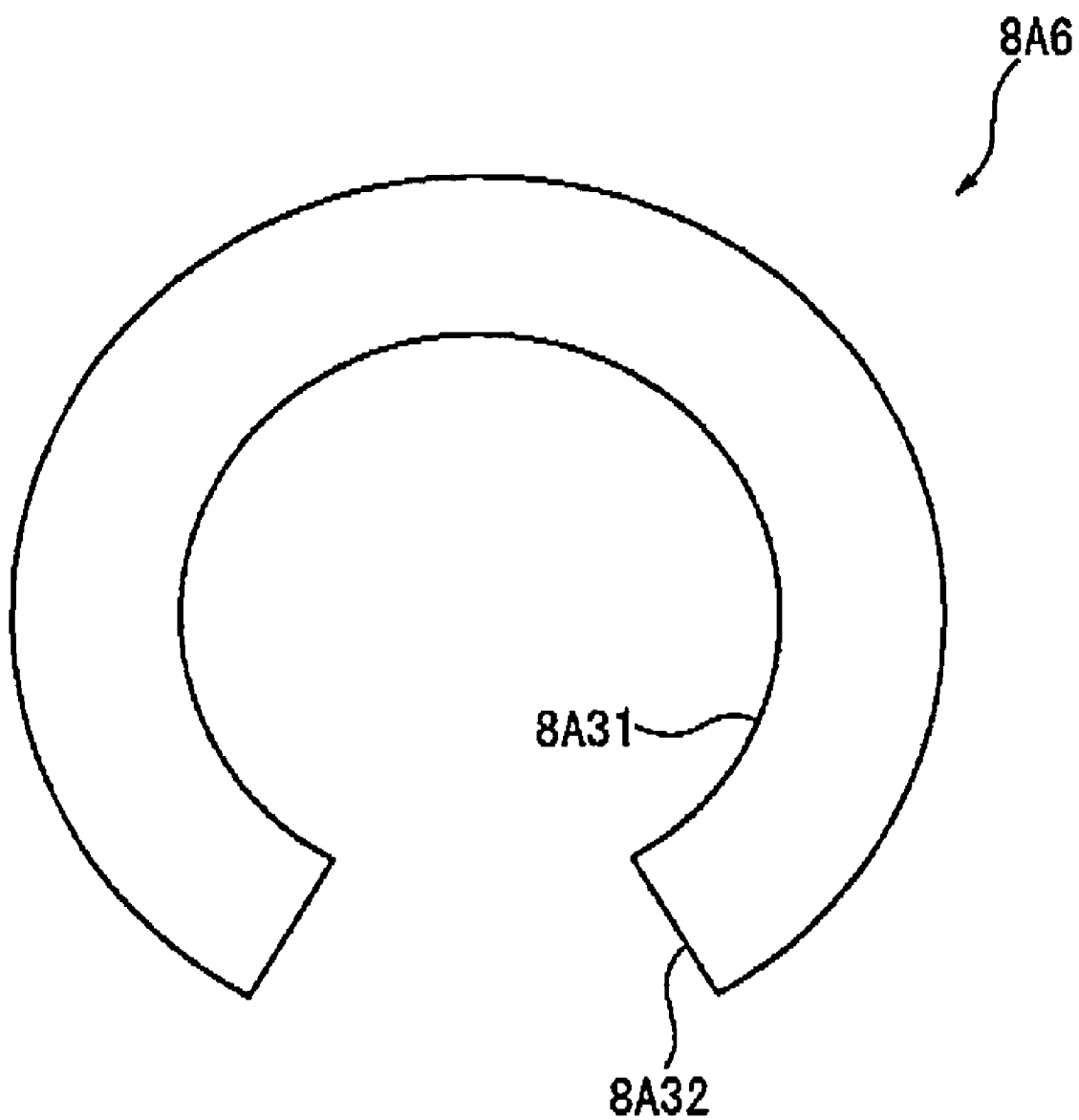
FIG. 10 is a front view showing a circular component according to a still further modification of each exemplary embodiment above.

FIGS. 8 to 10 show modifications of the exemplary embodiments, and specifically shows circular components of other shapes.

Examples of another circular component mounted on the large-diameter portion 8A2 are circular components 8A4 to 8A6 respectively shown in FIGS. 8 to 10.

As shown in FIG. 8, the circular component 8A4 is a substantially C-shaped member having an opening 8A31 and a cutout 8A32, and one protrusion 8A43 that narrows as extending to its tip end is provided on an end of the circular component 8A4 opposite to the cutout 8A32. The protrusion 8A43 is to be located radially externally to the large-diameter portion 8A2, from which an electric discharge is started when the lighting of the discharge lamp is initiated.

The circular component 8A5 is substantially circular in top view as shown in FIG. 9, substantially the center of which is provided with a substantially circular opening 8A51 into which the inner layer 8A221 of the coil 8A22 is inserted. A diameter of the opening 8A5 is set to be larger than that of the large-diameter portion 8A2. When the lighting of the discharge lamp is initiated, an electric discharge is started from a portion of an outer periphery of the circular component 8A5 that faces the trigger wire 53

The circular component 8A6, which is substantially C-shaped in top view as shown in FIG. 10 as if the protrusion 8A43 is removed from the circular component 8A4, includes an opening 8A31 and a cutout 8A32. With this arrangement, when the lighting of the discharge lamp is initiated, an electric field tends to be concentrated on an end periphery of the cutout 8A32. In addition, since the end periphery has an acute angle, an electric field tends to be concentrated particularly on the end periphery, so that the starting point of an electric discharge can be placed on the end periphery. By placing the cutout 8A32 to face the trigger wire 53 at this time, the starting point of an electric discharge can be more reliably placed on the end periphery.

Accordingly, an arrangement where one of the circular components 8A4 to 8A6 is mounted on the large-diameter portion 8A2 can also exert the same advantages as does the discharge lamp 51A in which the circular component 8A3 is mounted. Particularly, an arrangement where one of the circular components 8A4 to 8A6 is mounted on the large-diameter portion 8A2 between substantially the center of the portion 8A2 and the end of the portion 8A2 adjacent to the other electrode can prevent an arc from colliding to the inner wall of the emitting portion 511. As is the above-described circular component 8A3, each of the circular components 8A4 to 8A6 may be made of a material prepared by adding the ignition assisting material to tungsten.

The circular component 8A3 and the ring-shaped member 8D3 are mounted on the electrode 8AR and the electrode 8DR located adjacent to the sub-reflecting mirror 52 respectively in the first and fourth exemplary embodiments while the protrusion 8B212 and the protrusion 8C223 are mounted on the electrode 8BR and the electrode 8CR located adjacent to the sub-reflecting mirror 52 respectively in the second and third exemplary embodiments. However, the invention is not limited thereto. Specifically, the circular component 8A3 to 8A6, the ring-shaped member 8D3, the protrusion 8B212 or the protrusion 8C223 may be mounted on both the paired electrodes, or alternatively may be mounted only on the electrode located opposite to the sub-reflecting mirror 52. Further alternatively, the circular components 8A3 to 8A6, the ring-shaped member 8D3 and the protrusions 8B212 and 8C223 may be mounted in a combined manner on at least one of the electrodes.

While the circular component 8A3 and the ring-shaped member 8D3 are respectively mounted on the coil 8A22 in the first and fourth exemplary embodiments, the invention is not limited thereto. For instance, the circular component 8A3 or the ring-shaped member 8D3 may be mounted on the body 8A21.

Specifically, as in the protrusions 8B212 and 8C223, when the circular component 8A3 and the ring-shaped member 8D3 are mounted on the coil 8A22, the circular component 8A3 and the ring-shaped member 8D3 can sustainably serve as the starting points of an electric discharge for a long time because the coil 8A22 is less worn and less deformed than the body 8A21. On the other hand, when the circular component 8A3 and the ring-shaped member 8D3 are mounted on the body 8A21, heat generated by an electric discharge can be conducted to the body 8A21 with enhanced efficiency, thereby enhancing triggering characteristics of the discharge lamp.

While the circular component 8A3 includes the plural protrusions 8A33 in the first exemplary embodiment, the invention is not limited thereto. For instance, the circular component 8A3 may include the single protrusion 8A33 as in the above-described circular component 8A4, or alternatively may include no protrusion 8A33 as in the above-described circular component 8A6. In short, the number of the protrusion may be suitably determined. In addition, like the above-described circular component 8A5, the circular components 8A3 and 8A4 may include no cutout 8A32.

While the protrusions 8B212, 8C223 as the projecting part project respectively toward the rear ends of the electrodes 8BR and 8CR (in the direction away from the other electrode 8AL) in the second and third exemplary embodiments, the invention is not limited thereto. In short, the protrusions 8B212 and 8C223 may not necessarily project toward the rear ends. The protrusions 8B212 and 8C223 may not necessarily project toward the trigger wire 53, either. Further, the invention is also applicable to a discharge lamp including no trigger wire 53.

While the protrusion 8B212 and 8C223 are respectively singularly mounted on the large-diameter portions 8B2 and 8C2 in the second and third exemplary embodiments, the number of the protrusions 8B212 and 8C223 each may be suitably determined.

While the large-diameter portions 8A2, 8B2 and 8C2 respectively include: the bodies 8A21 and 8B21 formed as if the front end of the small-diameter portion 8A1 is bulged to form substantially a sphere shape; and the coils 8A22 and 8C22 wounded around the small-diameter portion 8A1 so as to be connected to the rear end of the bodies 8A21 and 8B21 in the above exemplary embodiments, the invention is not limited thereto. For instance, the coil may not be necessarily provided. In such an arrangement, the dimension of the body may be set in accordance with wattage of the discharge lamp. The winding number and the layer number of the coil may be suitably determined. Alternatively, the coil may be formed by winding the wire with a predetermined space interposed instead of close winding the wire. Further, the body may be formed by fusing the front end of the coil by heat treating such as laser irradiation.

While the projector 1 includes the three liquid crystal display panels 442R, 442G, 442B in each of the above exemplary embodiments, the invention is not limited thereto. In other words, the invention is also applicable to projectors including two or less liquid crystal display panels or to projectors including four or more liquid crystal display panels.

While the optical unit 4 is substantially L-shaped in top view in the above embodiments, the optical unit 4 is not limited thereto but may be substantially U-shaped in top view.

While the transmissive liquid crystal display panel 442 in which a light-incident surface and a light-exiting surface are different is used in each of the above exemplary embodiments, a reflective liquid crystal display panel in which the light-incident surface and the light-exiting surface are the same may be used.

While the projector 1 including the liquid crystal display panel 442 as the optical modulator is exemplified in each of the above exemplary embodiments, a differently-arranged optical modulator may be used, as long as the optical modulator modulates the incident light beams in accordance with the image information to generate an optical image. For instance, the invention is applicable to projectors that use optical modulators other than liquid crystal, an example of which is a device using a micromirror. When such an optical modulator is used, the polarization plates 443 and 445 respectively located on the light incident side and the light exiting side may not be needed.

While the projector 1 uses the light source device 411 provided with the discharge lamp 5 having the discharge lamp 51A, 51B, 51C or 51D in each of the above exemplary embodiments, the invention is not limited thereto. In other words, the light source device 411 may be applied to other illumination units. Alternatively, the discharge lamp 5 may be independently used.

The invention, while being applicable to discharge lamps, is favorably applicable to discharge lamps particularly used in light source devices and projectors.

What is claimed is:

1. A discharge lamp, comprising:
   an emitting portion in which a pair of electrodes are disposed, an electric discharge being generated between the pair of electrodes so as to emit light;
   at least either one electrode of the pair of the electrodes including: a small-diameter portion, the small-diameter portion extending in a first direction; and a large-diameter portion provided on an end of the small-diameter portion, the end of the small-diameter portion being located close to the other electrode, the large-diameter portion having a larger diameter than the small-diameter portion; and
   a projecting part projecting in a direction orthogonal to the first direction, the projecting part projecting outward relative to an end of the large-diameter portion that is in the direction orthogonal to the first direction,
   wherein the projecting part is a circular component that is substantially circular-shaped and mounted on the large-diameter portion, and
   wherein the circular component includes an opening into which the large-diameter portion is inserted.

2. The discharge lamp according to claim 1, wherein the large-diameter portion includes: a coil wound along the first direction; and a body located closer to the other electrode than the coil.

3. The discharge lamp according to claim 1, wherein the circular component includes at least one protrusion that projects radially outward from the circular component, the at least one protrusion being narrowed as extending to its front end in a direction in which the at least one protrusion projects.

4. The discharge lamp according to claim 1, wherein the circular component includes a cutout connected to the opening, the cutout being formed along an axial direction of the circular component.

5. The discharge lamp according to claim 1, wherein the circular component is mounted on the large-diameter portion at a position between substantially the center of the large-diameter portion and an end of the large-diameter portion closer to the other electrode.

6. The discharge lamp according to claim 1, wherein the projecting part is made of a first material prepared by adding a ignition assisting material to a second material, the large-diameter portion being made of the second material.

7. A light source device, comprising: the discharge lamp according to claim 1; and a reflecting mirror that reflects light irradiated from the discharge lamp in one direction so as to transfer the light as light beams.

8. The light device according to claim 7, wherein the large-diameter portion includes: a coil wound along the first direction; and a body located closer to the other electrode than the coil.

9. The light device according to claim 7, further comprising:
   a trigger wire disposed along an outer surface of the discharge lamp, the trigger wire assisting the discharge lamp in igniting lighting when a voltage is applied; and
   the projecting part projecting toward the trigger wire.

10. The light device according to claim 7, further comprising:
    a sub-mirror that covers a portion of the emitting portion, the portion being adjacent to a first electrode of the pair of electrodes, the sub-mirror reflecting light incident thereon toward a second electrode side of the pair of electrodes; and
    the projecting part being provided only on the first electrode of the pair of electrodes, the first electrode being adjacent to the sub-mirror.

11. A projector, comprising: the light source device according to claim 7; an optical modulator that modulates the light beams irradiated from the light source device in accordance with image information; and a projecting part optical device that projects the modulated light beams.

12. The projector according to claim 11, wherein the large-diameter portion includes: a coil wound along the first direction; and a body located closer to the other electrode than the coil.

13. The projector according to claim 11, further comprising:
    a trigger wire disposed along an outer surface of the discharge lamp, the trigger wire assisting the discharge lamp in igniting lighting when a voltage is applied; and
    the projecting part projecting toward the trigger wire.

14. The projector according to claim 11, further comprising:
    a sub-mirror that covers a portion of the emitting portion, the portion being adjacent to a first electrode of the pair of electrodes, the sub-mirror reflecting light incident thereon toward a second electrode side of the pair of electrodes; and
    the projecting part being provided only on the first electrode of the pair of electrodes, the first electrode being adjacent to the sub-mirror.

* * * * *